United States Patent
Passot et al.

(10) Patent No.: US 11,803,185 B2
(45) Date of Patent: Oct. 31, 2023

(54) SYSTEMS AND METHODS FOR INITIALIZING A ROBOT TO AUTONOMOUSLY TRAVEL A TRAINED ROUTE

(71) Applicant: Brain Corporation, San Diego, CA (US)

(72) Inventors: Jean-Baptiste Passot, Solana Beach, CA (US); Jaldert Rombouts, San Diego, CA (US); Cody Griffin, San Diego, CA (US); John Black, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 17/461,153

(22) Filed: Aug. 30, 2021

(65) Prior Publication Data

US 2022/0083058 A1 Mar. 17, 2022

Related U.S. Application Data

(63) Continuation of application No. 16/268,861, filed on Feb. 6, 2019, now abandoned, which is a continuation
(Continued)

(51) Int. Cl.
*G05D 1/00* (2006.01)
*G05D 1/02* (2020.01)
*A47L 11/40* (2006.01)

(52) U.S. Cl.
CPC ........ *G05D 1/0088* (2013.01); *A47L 11/4011* (2013.01); *A47L 11/4061* (2013.01);
(Continued)

(58) Field of Classification Search
CPC .. G05D 1/0088; G05D 1/0221; G05D 1/0231; G05D 1/0246; G05D 1/0272;
(Continued)

(56) References Cited

U.S. PATENT DOCUMENTS 4,278,142 A * 7/1981 Kono ................... G05D 1/0234
 701/28
4,790,402 A * 12/1988 Field ................... G05D 1/0244
 701/25

(Continued)

OTHER PUBLICATIONS

Parent U.S. Appl. No. 16/268,861, filed Feb. 6, 2019.

*Primary Examiner* — Aaron L Troost
(74) *Attorney, Agent, or Firm* — Reed Smith LLP; Sidharth Kapoor

(57) ABSTRACT

Systems and methods for initializing a robot to autonomously travel a route are disclosed. In some exemplary implementations, a robot can detect an initialization object and then determine its position relative to that initialization object. The robot can then learn a route by user demonstration, where the robot associates actions along that route with positions relative to the initialization object. The robot can later detect the initialization object again and determine its position relative to that initialization object. The robot can then autonomously navigate the learned route, performing actions associated with positions relative to the initialization object.

21 Claims, 14 Drawing Sheets

Related U.S. Application Data of application No. 15/152,436, filed on May 11, 2016, now Pat. No. 10,241,514.

(52) U.S. Cl.
CPC ......... *G05D 1/0221* (2013.01); *G05D 1/0231* (2013.01); *G05D 1/0246* (2013.01); *G05D 1/0272* (2013.01); *A47L 2201/04* (2013.01); *G05D 2201/0203* (2013.01)

(58) Field of Classification Search
CPC .......... G05D 1/0212; G05D 2201/0203; A47L 11/4011; A47L 11/4061; A47L 2201/04; B25J 9/161; B25J 9/163; B25J 9/1664; B25J 9/1697; B25J 11/0085; B25J 19/02
See application file for complete search history.

(56) References Cited

U.S. PATENT DOCUMENTS

| | | | | |
|---|---|---|---|---|
| 5,155,684 | A | * | 10/1992 | Burke ................. G05D 1/0246 701/28 |
| 5,341,540 | A | * | 8/1994 | Soupert ............... A47L 11/4061 180/169 |
| 2007/0198159 | A1 | * | 8/2007 | Durkos ................ G05D 1/0278 701/50 |
| 2014/0330496 | A1 | * | 11/2014 | Crouse ................ G05D 1/0221 701/70 |

* cited by examiner

SYSTEMS AND METHODS FOR INITIALIZING A ROBOT TO AUTONOMOUSLY TRAVEL A TRAINED ROUTE

CROSS-REFERENCE TO RELATED APPLICATIONS

This application is a continuation of U.S. patent application Ser. No. 16/268,861, filed Feb. 6, 2019, which is a continuation of U.S. patent application Ser. No. 15/152,436 filed May 11, 2016, now U.S. Pat. No. 10,241,514, the entire contents of which are hereby expressly incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to, inter alia, robotics systems and methods of utilizing the same. Specifically, in one aspect, the present disclosure relates to systems and methods for initializing and operating a robot to travel a trained route.

Background

Presently, programming robots can often involve exhaustive coding that anticipates, or attempts to anticipate, every situation in which the robot can encounter. Not only is such an approach costly from a time, energy, and computer resource perspective, but such an approach can also limit the capabilities of the robot. For example, many robots can only be effective in controlled environments with predictable or predefined conditions. These robots may not be effective in dynamically changing environments and/or new environments for which the robot was not specifically programmed. Where robots are programmed with general capabilities, the robots may be useful in many different tasks, but may be ineffective or inefficient at any particular one of those tasks. On the flipside, robots that are programmed to perform specific tasks effectively and efficiently may be limited to those tasks and not able to perform others. Similarly, many present robots can require expert technicians or other highly skilled workers to program and operate them. This requirement can increase the time and costs of operating the robots.

These challenges are particularly salient in programming robots to travel in routes. For example, in order to program a robot to autonomously navigate a desired path from a first point to a second point, a programmer may have to program a map and also identify each point on the map to which the robot should travel, along with the order or logic in which the robot should travel to those points. That programmer may have to program the robot for each environment and input each and every route desired, along with maps of the environment. In the alternative, if the programmer programs general rules and logic for the robot to determine routes, that robot may be slow and inefficient in following any particular route. In either case, such programming can be time-consuming and also require highly skilled workers to operate the robot.

Another challenge that can occur in programming robots to travel routes is initializing the robots such that the robots can determine relatively quickly their positions in environments. Being able to make such determinations can be important for robots to accurately navigate routes by informing the robots where they are located within the environment. Conventional systems and methods of determining positions involve users and/or technicians initially programming starting locations, and/or having the robots start at the same spot every time. In some cases, these systems and methods can be time consuming to implement and/or may not have the robustness that enables robots to navigate environments in a user-friendly manner.

Accordingly, there is a need for improved systems and methods for programming robots to travel routes.

SUMMARY

The foregoing needs are satisfied by the present disclosure, which provides for, inter alia, systems and methods for initializing and operating a robot to travel a trained route. Example implementations described herein have innovative features, no single one of which is indispensable or solely responsible for their desirable attributes. Without limiting the scope of the claims, some of the advantageous features will now be summarized.

In some implementations of this disclosure, systems and methods for detecting a position relative to an initialization object are disclosed. Advantageously, such detection can facilitate a robot learning a demonstrated route, and then autonomously navigating the demonstrated route.

In a first aspect, a robot is disclosed. In one exemplary implementation, the robot includes: a camera configured to take a first image of an initialization object while the robot is in a first location and a second image of the initialization object while the robot is in a second location; an odometry unit configured to determine positions of the robot with respect to the initialization object; and a controller. The controller is configured to: initialize the odometry unit relative to the initialization object determined at least in part from the first image while the robot is in the first location, learn a route by user demonstration, beginning from the first location, where the learned route associates actions of the robot with positions of the robot relative to the initialization object determined by the odometry unit, initialize the odometry unit relative to the initialization object determined at least in part from the second image while the robot is in the second location, and navigate the robot autonomously beginning from the second location through at least a portion of the learned route while instructing the robot to perform one or more associated actions based at least in part with positions of the robot relative to the initialization object determined by the odometry unit.

In one variant, the odometry unit includes at least one of an accelerometer, inertial measurement unit, lidar, odometer, gyroscope, visual odometer, and speedometer.

In another variant, the robot includes a user interface configured to prompt a user to initiate navigation of the robot autonomously through the learned route while the robot is in the second location.

In another variant, the robot is a floor cleaner.

In another variant, the robot includes a sensor configured to take a scan lidar image of a scene, wherein the controller is further configured to associate the scan lidar image to the initialization object and verify the initialization object using the scan lidar image.

In a second aspect, a method for operating a robot is disclosed. In one exemplary implementations, the method for operating the robot includes: taking a first image of an initialization object while the robot is in a first location; determining a first starting position of the robot relative to the initialization object based at least in part on the first image while the robot is in the first location; learning a route by user demonstration, beginning from the first location, where the learned route associates actions of the robot with positions of the robot relative to the initialization object, wherein the positions are determined at least in part from the first starting position; taking a second image of the initialization object while the robot is in a second location; determining a second starting position of the robot relative to the initialization object based at least in part on the second image while the robot is in the second location; navigating the robot autonomously beginning from the second location through at least a portion of the learned route while instructing the robot to perform one or more associated actions based at least in part with positions of the robot relative to the initialization object, wherein the positions are determined at least in part from the second starting position.

In one variant, taking the first image and taking the second image each include generating data with a sensor and storing the data in a data structure.

In another variant, the method further includes beginning autonomous navigation based at least in part on at least one of a user input and a characteristic of the initialization object.

In another variant, the method further includes selecting the learned route from a plurality of routes stored in memory.

In a third aspect, a non-transitory computer readable storage medium is disclosed. In one exemplary implementation, a non-transitory computer-readable storage medium having a plurality of instructions stored thereon is disclosed. The instructions being executable by a processing apparatus to operate a robot, the instructions configured to, when executed by the processing apparatus, cause the processing apparatus to: determine a starting position of the robot relative to an initialization object based at least in part on an image; and learn a route by user demonstration, where the learned route associates actions of the robot with positions of the robot relative to the initialization object, wherein the positions are determined at least in part from the starting position.

In one variant, the non-transitory computer-readable storage medium includes instructions that are further configured to, when executed by the processing apparatus, cause the processing apparatus to instruct the robot to autonomously navigate the learned route.

In another variant, the non-transitory computer-readable storage medium includes instructions that are further configured to, when executed by the processing apparatus, cause the processing apparatus to recognize a predetermined sequence of actions and autonomously navigate the learned route based at least in part on the predetermined sequence of actions.

In a fourth aspect, a robotic scrubber is disclosed. In one exemplary implementation, a robotic scrubber is configured to autonomously navigate a first learned route based at least in part on detection of a first initialization object and autonomously navigate a second learned route based at least in part on detection of a second initialization object.

In one variant, the first learned route and second learned route are demonstrated to the robotic scrubber by a user. In another variant, the detection of the first initialization object and the detection of the second initialization object are from an initialization location. In another variant, the detection of the first initialization object is from a first initialization location and the detection of the second initialization object is from a second initialization location, and the robotic scrubber is brought to the first initialization location and the second initialization under user control.

In a fifth aspect, an initialization object is disclosed. In one exemplary implementation, the initialization object is configured for detection by a robot. When the robot detects the initialization object, the robot initializes a position relative to the initialization object.

In one variant, the initialization object is a binary image. In another variant, the initialization object is asymmetrical. In another variant, the initialization object is associated with at least one learned route. In another variant, the initialization object is configured to cause autonomous navigation of the robot when the robot detects the initialization object.

There are additional aspects and implementations described in this disclosure. For example, some implementations of this disclosure can include an autonomously navigating robot comprising: a camera configured to take a first image of an initialization object while the robot is in a first location and a second image of the initialization object while the robot is in a second location; an odometry unit configured to determine positions of the robot with respect to the initialization object; and a controller configured to: initialize the odometry unit relative to the initialization object determined at least in part from the first image while the robot is in the first location, learn a route by user demonstration, beginning from the first location, where the learned route associates actions of the robot with positions of the robot relative to the initialization object determined by the odometry unit, initialize the odometry unit relative to the initialization object determined at least in part from the second image while the robot is in the second location, and navigate the robot autonomously beginning from the second location through at least a portion of the learned route while instructing the robot to perform one or more associated actions based at least in part with positions of the robot relative to the initialization object determined by the odometry unit.

In some implementations, the odometry unit comprises at least one of an accelerometer, inertial measurement unit, lidar, odometer, gyroscope, visual odometer, and speedometer. In some implementations, the initialization object is a binary image. In some implementations, the initialization object is a picture.

In some implementations the autonomously navigating robot further comprises a user interface configured to prompt a user to initiate navigation of the robot autonomously through the learned route while the robot is in the second location.

In some implementations, at least one of the one or more associated actions comprises a turning of the robot. In some implementations, at least one of the one or more associated actions comprises the activation of a switch configured to turn on a brush for the robot. In some implementations, the robot is a floor cleaner.

In some implementations, the first location and the second location are substantially similar. In some implementations, the one or more associated actions are further associated with trajectories of the robot.

In some implementations, the autonomously navigating robot further comprises a sensor configured to take a scan lidar image of a scene, wherein the controller is further configured to associate the scan lidar image to the initialization object and verify the initialization object using the scan lidar image.

As another example, some implementations of this disclosure can include a method for operating a robot comprising: taking a first image of an initialization object while the robot is in a first location; determining a first starting position of the robot relative to the initialization object based at least in part on the first image while the robot is in the first location; learning a route by user demonstration, beginning from the first location, where the learned route associates actions of the robot with positions of the robot relative to the initialization object, wherein the positions are determined at least in part from the first starting position; taking a second image of the initialization object while the robot is in a second location; determining a second starting position of the robot relative to the initialization object based at least in part on the second image while the robot is in the second location; navigating the robot autonomously beginning from the second location through at least a portion of the learned route while instructing the robot to perform one or more associated actions based at least in part with positions of the robot relative to the initialization object, wherein the positions are determined at least in part from the second starting position.

In some implementations, taking the first image and taking the second image each comprise generating data with a sensor and storing the data in a data structure.

In some implementations, the method for operating the robot further comprises beginning autonomous navigation based at least in part on at least one of a user input and a characteristic of the initialization object.

In some implementations, at least one of the one or more associated actions comprises turning the robot. In some implementations, at least one of the one or more associated actions comprises switching on a brush. In some implementations, navigating the robot autonomously further comprises navigating the robot autonomously until the robot detects the initialization object.

In some implementations, the method for operating the robot further comprise selecting the learned route from a plurality of routes stored in memory.

In some implementations, at least one of the one or more associated actions comprises associating actions of the robot with trajectories.

As another example, some implementations of this disclosure can include a non-transitory computer-readable storage medium having a plurality of instructions stored thereon, the instructions being executable by a processing apparatus to operate a robot, the instructions configured to, when executed by the processing apparatus, cause the processing apparatus to: determine a starting position of the robot relative to an initialization object based at least in part on an image; and learn a route by user demonstration, where the learned route associates actions of the robot with positions of the robot relative to the initialization object, wherein the positions are determined at least in part from the starting position.

In some implementations, the initialization object is a binary image. In some implementations, the associated actions comprise turning. In some implementations, the associated actions comprise switching on a brush.

In some implementations, the non-transitory computer-readable storage medium includes instructions that are further configured to, when executed by the processing apparatus, cause the processing apparatus to instruct the robot to autonomously navigate the learned route.

In some implementations, the non-transitory computer-readable storage medium includes instructions that are further configured to, when executed by the processing apparatus, cause the processing apparatus to recognize a predetermined sequence of actions and autonomously navigate the learned route based at least in part on the predetermined sequence of actions.

In some implementations, the instructions of the non-transitory computer-readable storage medium are further configured to, when executed by the processing apparatus: determine an action of the robot at a determined location of the robot; and execute the action; wherein the action comprises a turning action of the robot.

In some implementations, the instructions of the non-transitory computer-readable storage medium are further configured to, when executed by the processing apparatus: determine an action of the robot at a determined location of the robot; and execute the action; wherein the action comprises the activation of a switch configured to turn on a brush.

As another example, some implementations of this disclosure include a robotic scrubber configured to autonomously navigate a first learned route based at least in part on detection of a first initialization object and autonomously navigate a second learned route based at least in part on detection of a second initialization object.

In some implementations, the first learned route and second learned route are demonstrated to the robotic scrubber by a user. In some implementations, the detection of the first initialization object and the detection of the second initialization object are detected from an initialization location. In some implementations, the detection of the first initialization object is from a first initialization location and the detection of the second initialization object is from a second initialization location, and the robotic scrubber is brought to the first initialization location and the second initialization location under user control.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
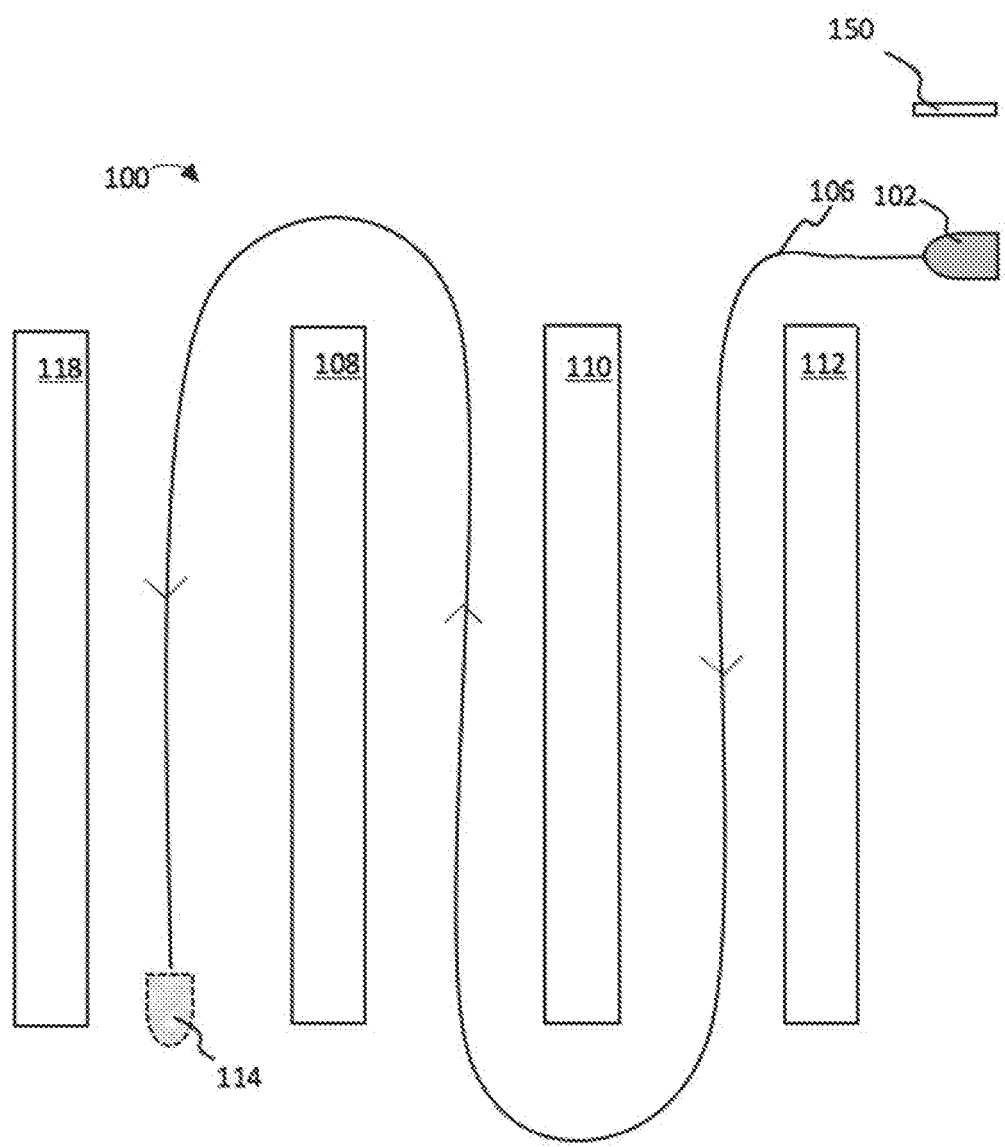
FIG. 1A is an overhead view of an example route autonomously navigated by a robot in accordance with implementations of the present disclosure.

All Figures disclosed herein are © Copyright 2016 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular implementations are described herein, many variations and permutations of these implementations fall within the scope of the disclosure. Although some benefits and advantages of the implementations are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods of operating a robot for autonomous navigation. More specifically, the present disclosure includes systems and methods for initializing the location of a robot for training and/or for autonomous navigation.

As used herein, a robot can include mechanical or virtual entities configured to carry out complex series of actions automatically. In some cases, robots can be electro-mechanical machines that are guided by computer programs or electronic circuitry. In some cases, robots can include electro-mechanical machines that are configured for autonomous navigation, where the robot can move from one location to another with little to no user control. Such autonomously navigating robots can include autonomous cars, floor cleaners (e.g., floor scrubbers, vacuums, etc.), rovers, drones, humanoid robots, and the like. In some implementations, some of the systems and methods described in this disclosure can be implemented to a virtual environment, where a virtual robot can detect an initialization object in a simulated environment (e.g., in a computer simulation) with characteristics of the physical world. After detecting the initialization object, the robot can learn routes and then autonomously navigate the learned routes in the simulated environment and/or in the real world using systems and methods disclosed in this disclosure.

Detailed descriptions of the various embodiments and variants of the system and methods of the disclosure are now provided. While primarily discussed in the context of robotic floor cleaners, it will be appreciated that the described systems and methods contained herein can be used in other robots including, for example, any autonomously navigating robot. Myriad other example implementations or uses for the technology described herein would be readily envisaged by those having ordinary skill in the art, given the contents of the present disclosure.

Advantageously, the systems and methods of this disclosure at least: (i) reduce the need for environment-specific programming; (ii) reduce the need for highly skilled technicians to program robots; (iii) provide application-specific performance from a generally programmed robot; (iv) enable effective autonomous navigation of robots; and (v) provide a fast and user-friendly approach to initializing a robot for autonomous navigation. Other advantages are readily discernable by one of ordinary skill given the contents of the present disclosure.

For example, by training robots to travel routes by demonstration, a user may not have to program every route beforehand. Advantageously, this can allow a user to train a robot to navigate environments that the user had not anticipated beforehand. Also, a user may not utilize any particular expertise to train the robot. For example, a user may not have to know computer science and/or be educated on how to program the robot. Instead, a user may just know how to perform the task that he/she desires the robot to do. For example, where the robot is a floor cleaner, the user may just know how to clean the floor, which he/she can demonstrate to the robot.

Moreover, training a robot that can learn a navigable route can allow a robot to be specifically programmed to efficiently navigate a particular environment while also being generally programmed to perform in many environments. Advantageously, this allows such robots to have the benefit of both being optimized in particular applications, yet having the ability, and flexibility, to perform in a variety of applications.

In some implementations of this disclosure, a robot can initialize to an initialization object, which can facilitate its route learning and autonomous navigation. Notably, the disclosed initialization relative to the initialization objects presents marked improvements in the fields of robotics and/or autonomous navigation in that it allows the robot to determine accurately where it is in its environment and/or its trajectory and to perform actions based at least in part on that positioning and/or trajectory. Advantageously, having a fast and effective way to initialize can allow a robot to associate actions to positions along its learned route. The robot can later replicate those actions when it autonomously navigates the learned route.

Also, some implementations of this disclosure enable robots to navigate and/or perform actions relative to fixed locations, which can provide consistency and/or replicability. Consistency and/or replicability can be desirable in many industries, such as floor cleaning, where a robot performs substantially similar tasks repeatedly.

Many present ways of sensing a position of a robot can be expensive in terms of costs of sensors, processing power, and/or energy. In some implementations described in this disclosure, relatively simple sensors (e.g., cameras) can be used to detect initialization objects. These relatively simple sensors can utilize less processing power to detect initialization objects, and can also consume less power in the process. Advantageously, this can allow robots to be more cost effective, occupy less space, and/or consume less power to run.

Also, having a robot that can detect initialization objects quickly and simply can improve user interaction with robots. In some cases, initialization objects can be symbols, images, shapes, items (e.g., furniture, statues, appliances, etc.), and/or any other objects. A user can then use that initialization object to begin robotic route learning and/or begin the robot's autonomous navigation. Having a visible initialization object can, in some cases, provide a user a sense or predictability in operating the robot, where the user can have the visible feedback of bringing the robot to the initialization object and seeing the robot behave in a predictable way. In some implementations, there can be a plurality of initialization objects where particular initialization objects can be associated with particular routes. This can enable a user to visually choose a route based on the initialization object, which can be advantageous especially in environments where operators may not be able to understand a particular language or use complex user interfaces.

In some implementations, a robot may learn to navigate a plurality of environments that are substantially similar using a plurality of routes. Accordingly, using an initialization object can facilitate navigation of particular environments by filtering and/or narrowing the number of routes and/or environments from which the robot may choose. This can reduce the chances a robot and/or a user incorrectly chooses a route, such as by choosing a route associated with a different environment. For example, a building can have a plurality of floors that are substantially similar, but with some variation. Each floor can have its own initialization object. When the robot initializes from the initialization object, it can filter the routes that it can navigate based at least in part on that initialization object, which can be associated with only a floor and/or particular routes. Accordingly, the robot and/or a user can select a desired route from the filtered list of routes.

In some cases, present robotic navigation may involve a plurality of robotically detectable symbols in which the robot moves towards each of those symbols. In some cases, such as in retail environments, having too many symbols around can produce a negative perception to customers. Thus, it may be desirable to have systems and methods to enable robots to navigate autonomously with reduced or no unattractive symbols. Having an initialization object, which can include symbols, images, shapes, items, etc. that may or may not already exist in the environment, can be advantageous in that a customer may not readily notice the initialization objects and/or be distracted by them. Furthermore, even where robotic symbols are used, a robot can initialize from fewer symbols, in some case a single symbol, and be able to autonomously navigate.

FIG. 1A illustrates an overhead view of an example route 106 autonomously navigated by robot 102 through implementations of this disclosure. Robot 102 can autonomously navigate through environment 100, which can comprise various objects 108, 110, 112, 118. Robot 102 can start at an initial location and end at end location 114. The initial location can be determined by its relationship to initialization object 150. In some implementations of this disclosure, the initial location can be any position in which robot 102 can detect initialization object 150. However, in some cases, a user may bring robot 102 to a particular place on the floor (e.g., a place demarcated and/or remembered by the user), as illustrated in FIG. 1D, where initial location 104 is a position on the floor. Bringing robot 102 to a particular place on the floor, e.g., initial location 104, can be advantageous in that it can make it very likely that robot 102 can detect initialization object 150 and initialize. Bringing robot 102 to a particular place on the floor, e.g., initial location 104, can also be helpful for a user to have a sense of routine and predictability in operating robot 102.

Initialization object 150 can include tangible objects (e.g., furniture, statues, appliances, etc.), markings, and/or digital displays. In some implementations, initialization object 150 can be detected and/or recognized by robot 102 using at least in part exteroceptive sensor 300, which will be discussed more with reference to FIGS. 3A-B, as well as elsewhere throughout this disclosure. When robot 102 detects initialization object 150, through implementations of this disclosure, robot 102 can determine robot 102's position relative to initialization object 150 (and/or a point therein), which can allow, among other things, robot 102 to initialize robot 102's odometry, such as odometry using at least in part an odometry unit 326, proprioceptive sensor 308, and other sensors which will be discussed more with reference to FIGS. 3A-3B as well as elsewhere throughout this disclosure. As used herein, the term position has its ordinary and customary meaning. For example, in some cases, position can include a location in terms of displacement, coordinates, etc. of an object, robot 102, etc. In some cases, position can also include an orientation of an object, robot 102, etc. Accordingly, in some cases, the terms position and pose may be used interchangeably to include one or more of location, displacement, and orientation. Advantageously, determining robot 102's position can enable robot 102 to use initialization object 150 (and/or a point therein) as a reference point for robot 102's odometry and/or sensors as robot 102 proceeds with learning a route, such as learning route 116 in environment 100 illustrated in FIG. 1B. This use of initialization object 150 (and/or a point therein) as a reference point can later be again used by robot 102 in autonomously navigating learned route 116 as route 106. Also, advantageously, it can be difficult to demarcate reference points for robot 102, or such demarcation may involve putting many unattractive symbols or items throughout an environment. Allowing robot 102 to initialize from an initialization object 150 can, in some implementations, reduce or eliminate the use of unattractive symbols.

By way of illustration, in some implementations, robot 102 can be a robotic floor cleaner, such as a robotic floor scrubber, vacuum cleaner, steamer, mop, sweeper, and the like. Environment 100 can be a space having floors that are desired to be cleaned. For example, environment 100 can be a store, warehouse, office building, home, storage facility, etc. One or more of objects 108, 110, 112, 118 can be shelves, displays, objects, items, people, animals, or any other entity or thing that may be on the floor or otherwise imped the robot's ability to navigate through the environment. Route 106 can be the cleaning path traveled by robot 102 autonomously. Route 106 can follow a path that weaves between objects 108, 110, 112, 118 as illustrated in example route 106. For example, where objects 108, 110, 112, 118 are shelves in a store, robot 102 can go along the aisles of the store and clean the floors of the aisles. However, other routes are also contemplated, such as, without limitation, weaving back and forth along open floor areas and/or any cleaning path a user could use to clean the floor (e.g., if the user is manually operating a floor cleaner). Accordingly, one or more of routes 106, 116, 126, illustrated in FIGS. 1A, 1B, and 1C, respectively, are meant merely as illustrative examples and can appear differently as illustrated. Also, as illustrated, one example of environment 100 is shown, however, it should be appreciated that environment 100 can take on any number of forms and arrangements (e.g., of any size, configuration, and layout of a room or building) and is not limited by the example illustrations of this disclosure.

In route 106, robot 102 can begin at the initial location where it detects initialization object 150, which can be robot 102's starting point. Robot 102 can then clean along route 106 autonomously (e.g., with little or no control from user 904) until it reaches end location 114, where it can stop cleaning. End location 114 can be designated by a user 904, later described with reference to FIG. 9B. In some cases, end location 114 can be the location in route 106 after which robot 102 has cleaned the desired area of floor. In some cases, end location 114 can be the same, or substantially similar, as the initial location so that robot 102 performs substantially a closed loop in cleaning and ends up near its starting point at the initial location. In some cases, end location 114 can be a location for storage for robot 102, such as a temporary parking spot, storage room/closet, and the like. In some cases, end location 114 can be the point where user 904 decided to stop performing actions and training robot 102. For example, in the context of floor cleaners (e.g., floor scrubbers, vacuum cleaners, etc.), robot 102 may or may not clean at every point along route 106. By way of illustration, where robot 102 is a robotic floor scrubber, the cleaning system (e.g., water flow, cleaning brushes, etc.) of robot 102 may only be operating in some portions of route 106 and not others. For example, robot 102 may associate certain actions (e.g., turning, turning on/off water, spraying water, turning on/off vacuums, moving vacuum hose positions, gesticulating an arm, raising/lowering a lift, moving a sensor, turning on/off a sensor, etc.) with particular positions and/or trajectories (e.g., while moving in a certain direction or in a particular sequence along route 106) along the demonstrated route. In the context of floor cleaners, such association may be desirable when only some areas of the floor are to be cleaned but not others and/or in some trajectories. In such cases, robot 102 can turn on a cleaning system in areas where user 904 demonstrated for robot 102 to clean, and turn off the cleaning system otherwise.

Figure 1B:
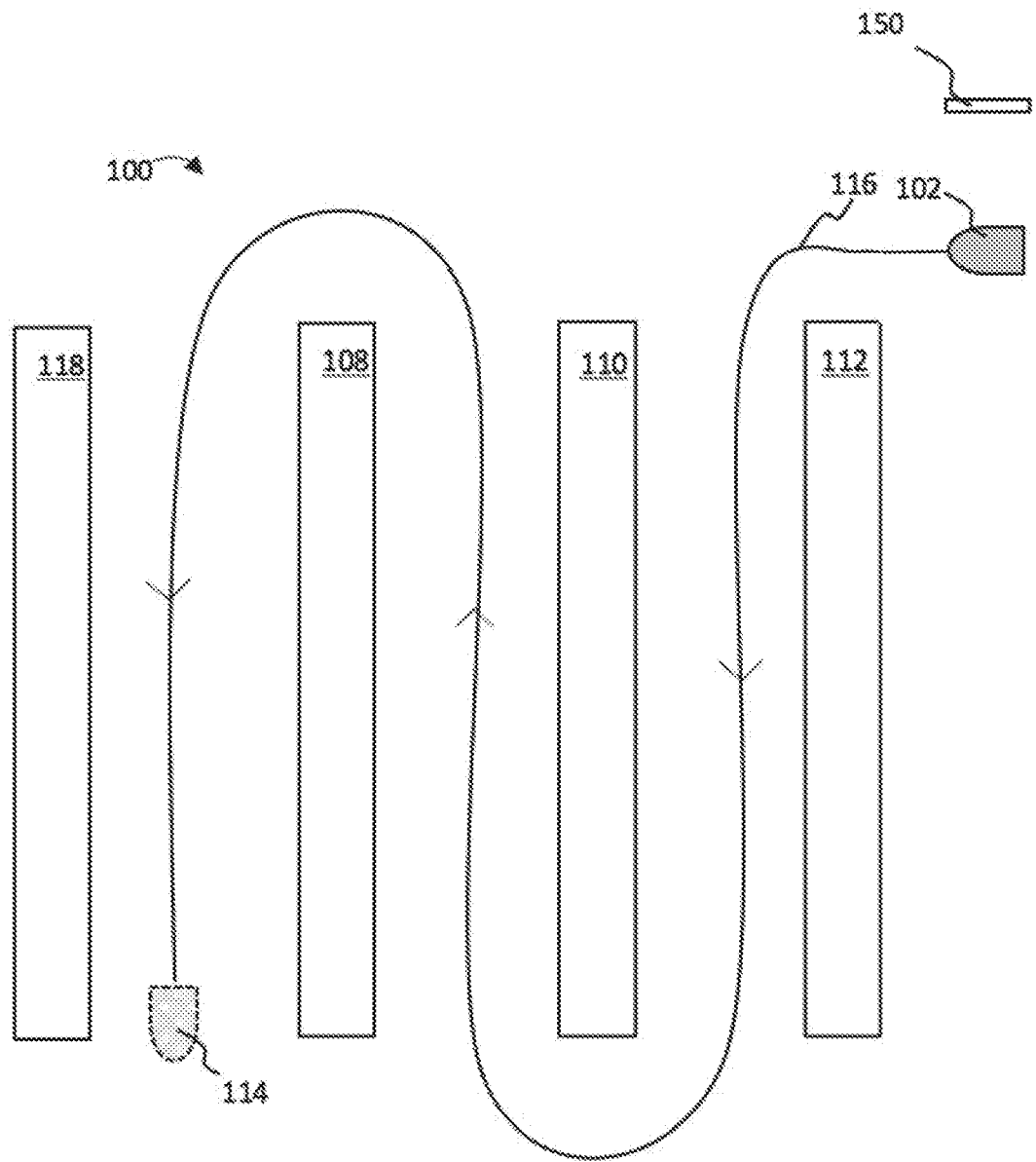
FIG. 1B is an overhead view of the example route illustrated in FIG. 1A illustrating a user demonstrating the route to the robot in accordance with implementations of the present disclosure.
Figure 1C:
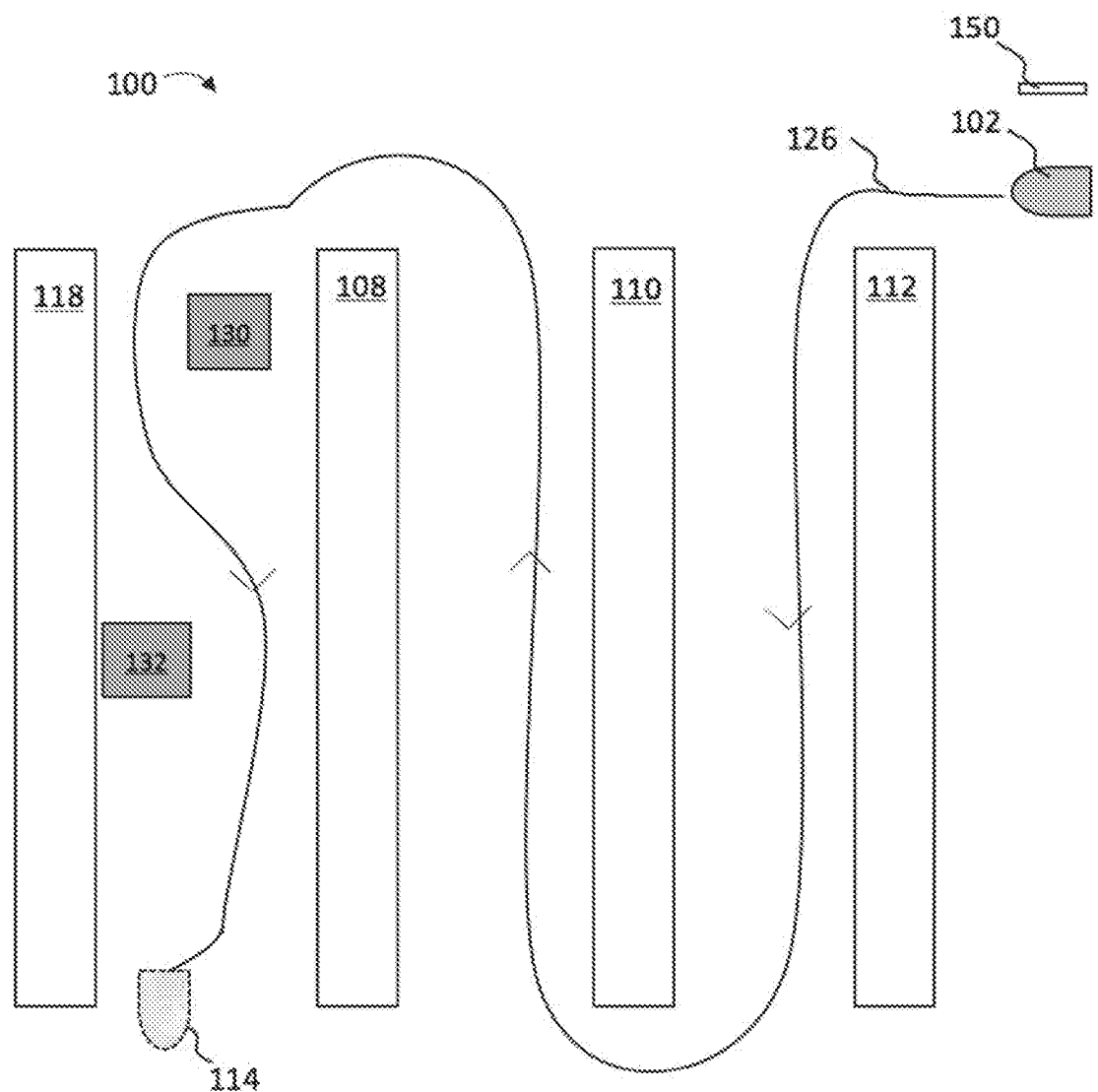
FIG. 1C is an overhead view of an alternative example route autonomously navigated by robot shown in FIGS. 1A and 1B, where the robot avoids objects in accordance with some principles of the present disclosure.
Figure 1D:
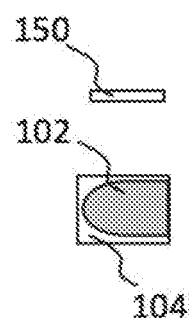
FIG. 1D is an overhead view of an example initial location that is a location on the floor for initializing a robot in accordance with some implementations of the present disclosure.

FIG. 1B illustrates an overhead view of example user 904 demonstrating route 116 to example robot 102 before example robot 102 autonomously travels example route 106 in environment 100. In demonstrating route 116, a user can start robot 102 at the initial location (e.g., the initial location relative to initialization object 150 and/or within initial location 104). Robot 102 can then weave around objects 108, 110, 112, 118. Robot 102 can finally end at end location 114. In some cases, route 106 can be exactly the same as route 116. In some cases, route 106 might not be precisely the same as route 116, but can be substantially similar. For example, as robot 102 autonomously navigates, robot 102 uses its sensors (e.g., sensors 300, 308 as will be described with reference to FIGS. 3A-3B and elsewhere throughout this disclosure) to sense where robot 102 is in relationship to robot 102's surroundings as it navigates. Such sensing may be imprecise in some instances, which may cause at least in part robot 102 to not navigate the precise route 116 demonstrated and that robot 102 was trained to follow. In some cases, changes to environment 100, such as the moving of shelves and/or changes in the items on the shelves, can cause robot 102 to deviate from route 116 when it autonomously navigates. As another example, as illustrated in FIG. 1C robot 102 may avoid objects 130, 132 by turning around them when autonomously navigating route 126, which can be another route travelled by robot 102 based at least in part on demonstrated route 116. Objects 130, 132 might not have been present (and/or avoided) when the user demonstrated route 116. For example, objects 130, 132 may be temporarily placed and/or transient objects/items, and/or transient and/or dynamic changes to the environment 100. As another example, user 904 may have done a poor job demonstrating route 116. For example, user 904 may have crashed and/or bumped into a wall, shelf, object, obstacle, etc. In these cases, robot 102 can store in memory (e.g., memory 302) one or more actions that it can correct, such as crashing and/or bumping to a wall, shelf, object, obstacle, etc. When robot 102 then autonomously navigates demonstrated route 116 as route 126, robot 102 can correct such actions and/or not perform them (e.g., not crash and/or bump into a wall, shelf, object, obstacle, etc.) when it is autonomously navigating.

As previously mentioned, as user 904 demonstrates route 116, user 904 can perform one or more actions that can be also demonstrated to and learned by robot 102 as robot 102 learns to navigate. These actions can include any actions that robot 102 may perform, such as turning, turning on/off water, spraying water, turning on/off vacuums, moving vacuum hose positions, gesticulating an arm, raising/lowering a lift, moving a sensor, turning on/off a sensor, etc. For example, user 904 can turn on and off the cleaning system of robot 102 in order to train robot 102 where to clean along route 116 (and subsequently where to clean when robot 102 autonomously cleans routes 106, 126) and/or in what trajectories. Robot 102 can record these actions in memory 302 (later described in FIG. 3A) and later perform them when autonomously navigating. For example, in some implementations, robot 102 can associate one or more positions relative to initialization object 150 with the learned actions.

Figure 2:
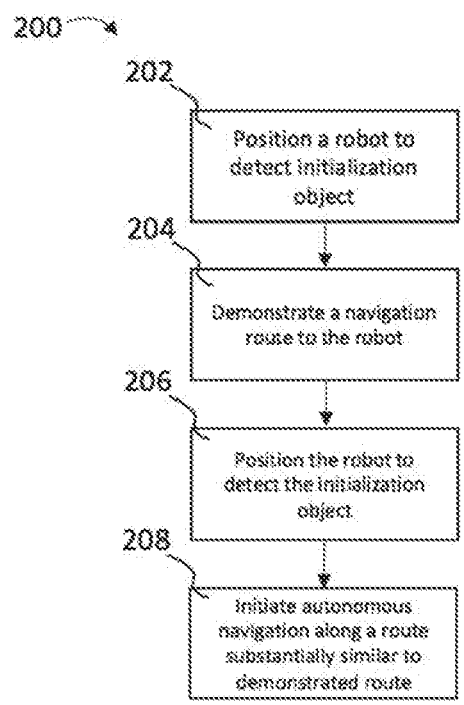
FIG. 2 is a process flow diagram of an exemplary method for training a robot to autonomously navigate a route in accordance with some implementations of the present disclosure.

FIG. 2 illustrates a process flow diagram of an example method 200 for training robot 102 to autonomously navigate a route (e.g., route 106, 126). Portion 202 can include positioning robot 102 to detect initialization object 150. This first placement of robot 102 into the initial location relative to initialization object 150 can be performed by user 904, who can be a janitor, custodian, and/or any other person or robot, who drives, remote controls, pushes, or otherwise controls robot 102 to a location (e.g., an initial location) to detect initialization object 150.

Portion 204 can include demonstrating a navigation route to robot 102. By way of illustration using FIG. 1B, user 904 can demonstrate to robot 102 by, without limitation, driving, remote controlling, pushing, or otherwise controlling robot 102 along route 116. In this way, user 904 can demonstrate to robot 102 the desired route for travelling. At the same time, user 904 can demonstrate to robot 102 actions (e.g., turning, turning on/off water, spraying water, turning on/off vacuums, moving vacuum hose positions, gesticulating an arm, raising/lowering a lift, moving a sensor, turning on/off a sensor, etc.) to perform while travelling the route. In some cases, these actions can be associated with positions and/or trajectories along the learned route, such as positions and/or trajectories relative to initialization object 150. In the context of robotic floor cleaners, demonstrated route 116 can be the desired route for cleaning the floor. In this way, user 904 can train robot 102 how to clean the floor.

Portion 206 can include positioning robot 102 to detect initialization object 150 once again. This second placement of robot 102 to detect initialization object 150 can occur at a later point in time after portion 204, such as substantially right after the demonstration of portion 204, or at some later time, such as hours later, days later, weeks later, or whenever the user 904 desires to clean the floor.

Portion 208 can include initiating autonomous navigation. In some cases, after a user has initiated autonomous navigation, robot 102 can travel along route 106 (or route 126 in some cases), which can be substantially similar to demonstrated route 116. In some implementations, user 904 can select the demonstrated route on user interface 318, as will be described with reference to FIG. 10 as well as elsewhere throughout this disclosure. By way of illustration using FIG. 1A, robot 102 can then navigate route 106, (or a route substantially similar to route 106) autonomously from the initial location to end location 114.

Figure 3A:
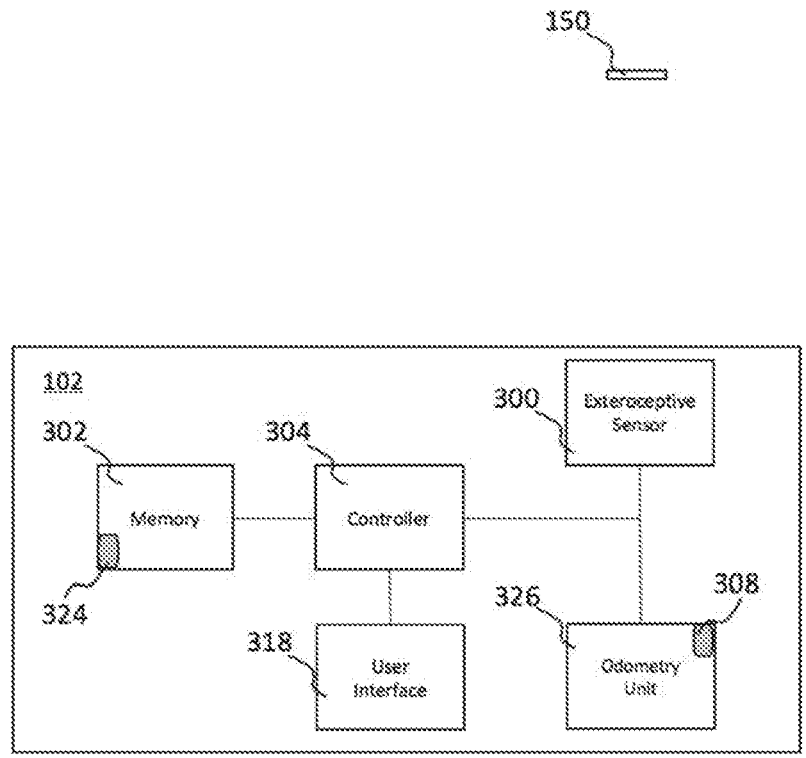
FIG. 3A is a functional block diagram of an exemplary robot in accordance with some implementations of the present disclosure.

FIG. 3A illustrates a functional block diagram of example robot 102 in some implementations. As illustrated in FIG. 3A, robot 102 can include controller 304, memory 302, user interface 318, exteroceptive sensor 300, odometry unit 308, proprioceptive sensor 308, as well as other components and subcomponents (e.g., some of which may not be illustrated). Although a specific implementation is illustrated in FIG. 3A, it is appreciated that the architecture may be varied in certain implementations as would be readily apparent to one of ordinary skill given the contents of the present disclosure.

Controller 304 can control the various operations performed by robot 102. Controller 304 can include one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 304 can be operatively and/or communicatively coupled to memory 302. Memory 302 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output RAM ("EDO"), fast page mode RAM ("FPM"), reduced latency DRAM ("RLDRAM"), static RAM ("SRAM"), "flash" memory (e.g., NAND/NOR), memristor memory, pseudostatic RAM ("PSRAM"), etc. Memory 302 can provide instructions and data to controller 304. For example, memory 302 can be a non-transitory, computer-readable storage medium having a plurality of instructions stored thereon, the instructions being executable by a processing apparatus (e.g., controller 304) to operate robot 102. In some cases, the instructions can be configured to, when executed by the processing apparatus, cause the processing apparatus to perform the various methods, features, and/or functionality described in this disclosure. Accordingly, controller 304 can perform logical and arithmetic operations based on program instructions stored within memory 302.

In some implementations, memory 302 can store a library 324 of images of initialization object 150. In some implementations, this library 324 can include images of initialization object 150 and/or substantially similar objects to initialization object 150 in different lighting conditions, angles, sizes, distances, clarity (e.g., blurred, obstructed/occluded, partially off frame, etc.), colors, surroundings, etc. The images in library 324 can be taken by a sensor (e.g., camera 304 or any other camera) or generated automatically, such as with a computer program that is configured to generate/simulate (e.g., in a virtual world) library images of initialization object 150 or substantially similar objects (e.g., which can generate/simulate these library images entirely digitally or beginning from an actual image of initialization object or substantially similar objects) from different lighting conditions, angles, sizes, distances, clarity (e.g., blurred, obstructed/occluded, partially off frame, etc.), colors, surroundings, etc. Library 324 can be used to train robot 102 to identify initialization object 150 in many conditions and/or to identify the position of robot 102 as will be discussed more with reference to FIG. 6 as well as throughout this disclosure. The number of images in library 324 can depend at least in part on one or more of the number of available images of initialization object 150 and/or substantially similar objects, the variability of the surrounding environment in which robot 102 will operate, the complexity of initialization object 150 and/or substantially similar objects, the variability in appearance of initialization object 150 and/or substantially similar objects, and the amount of available storage space (e.g., in memory 302 or on a server). For example, library 324 can contain approximately 1, 5, 10, 100, 1000, 10,000, 100,000, 1,000,000, 10,000,000, or any number of images of initialization object 150 and/or substantially similar objects. In some implementations, library 324 may be stored in a network (e.g., cloud, server, etc.) and may not be saved within memory 302.

In some implementations, exteroceptive sensor 300 can comprise systems and/or methods that can detect characteristics within and/or around robot 102. Exteroceptive sensor 300 can comprise a plurality and/or a combination of sensors. Exteroceptive sensor 300 can include sensors that are internal to robot 102 or external, and/or have components that are partially internal and/or partially external. In some cases, exteroceptive sensor 300 can include exteroceptive sensors such as sonar, lidar, radar, lasers, cameras (including video cameras, infrared cameras, 3D cameras, etc.), antenna, microphones, and/or any other sensor known in the art. In some implementations, exteroceptive sensor 300 can collect raw measurements (e.g., currents, voltages, resistances gate logic, etc.) and/or transformed measurements (e.g., distances, angles, detected points in obstacles, etc.). In some implementations, exteroceptive sensor 300 can be configured to detect initialization object 150. Exteroceptive sensor 300 can generate data based at least in part on measurements. Such data can be stored in data structures, such as matrices, arrays, etc. In some implementations, the data structure of the sensor data can be called an image.

In some implementations, odometry unit 326 can be configured to determine the odometry of robot 102. For example, odometry unit 326 can include proprioceptive sensor 308, which can comprise sensors such as accelerometers, inertial measurement units ("IMU"), odometers, gyroscopes, speedometers, cameras (e.g. using visual odometry), clock/timer, and the like. Proprioceptive sensor 308 can be used by odometry unit 326 for odometry to facilitate autonomous navigation of robot 102. This odometry can include robot 102's position (e.g., where position includes robot's location, displacement and/or orientation, and can sometimes be interchangeable with the term pose as used herein) relative to the initial location (e.g., the initial location relative to initialization object 150 and/or within initial location 104). In some implementations, proprioceptive sensor 308 can collect raw measurements (e.g., currents, voltages, resistances gate logic, etc.) and/or transformed measurements (e.g., distances, angles, detected points in obstacles, etc.). Such data can be stored in data structures, such as matrices, arrays, etc. In some implementations, the data structure of the sensor data can be called an image.

In some implementations, user interface 318 can be configured to enable a user (e.g., user 904) to interact with robot 102. For example, user interfaces 318 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. User interface 318 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In some implementations user interface 318 can be positioned on the body of robot 102. In some implementations, user interface 318 can be positioned away from the body of robot 102, but can be communicatively coupled to robot 102 (e.g., via communication units including transmitters, receivers, and/or transceivers) directly or indirectly (e.g., through a network, server, and/or a cloud).

The wireless coupling can include wireless transmissions configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), global system for mobile communications ("GSM"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), etc.), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, networks, servers, and/or clouds can include network interfaces. Network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Wired coupling can include wired connections, such as any cable that has a signal line and ground. For example, such cables can include Ethernet cables, coaxial cables, Universal Serial Bus ("USB"), Firewire, and/or any wired connection known in the art. Such protocols can be used by robot 102 to communicate to internal systems (e.g., communications between any components and/or subcomponents of robot 102) and/or external systems (e.g., computers, smart phones, tablets, data capture systems, mobile telecommunications networks, clouds, servers, and/or the like).

Figure 3B:
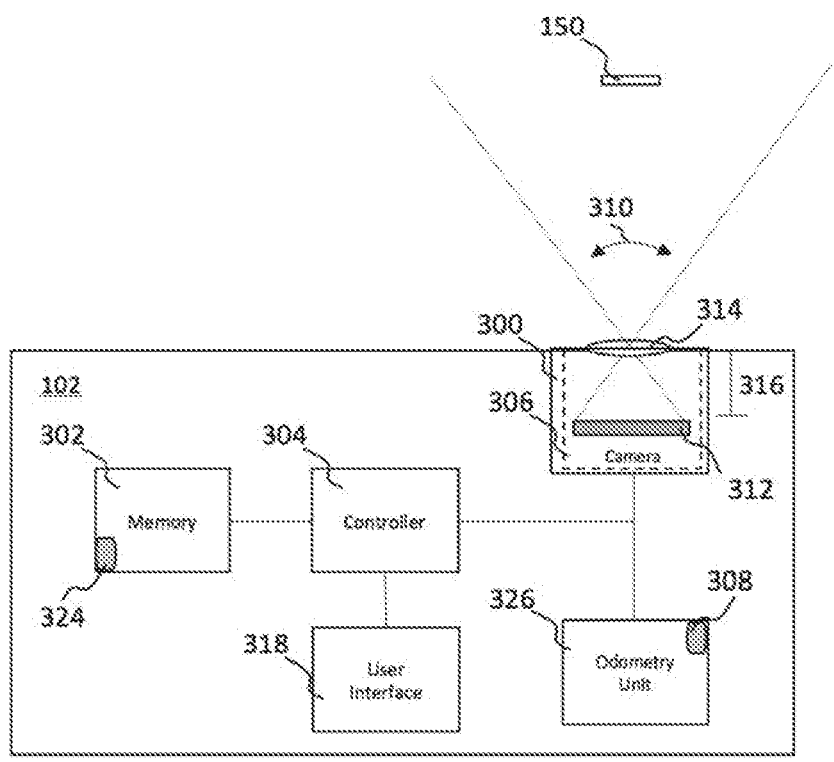
FIG. 3B is the functional block diagram from FIG. 3A with an example camera included as part of the exteroceptive sensor in accordance with some implementations of the present disclosure.

In some implementations of this disclosure, exteroceptive sensor 300 includes camera 306. FIG. 3B illustrates the functional block diagram from FIG. 3A with example camera 306 included in example exteroceptive sensor 300. Camera 306 can be an optical instrument for recording images. In some cases, images can be still photographs, or a sequence of images (e.g., frames) forming a video or movie. As an illustrative example of how camera 306 may take an image, light can enter an enclosed box (e.g., the body of camera 306) through a lens 314. The light can be recorded on a light-sensitive medium as an image. The medium can store the image digitally, in some cases, or in analog form. In some implementations, a shutter mechanism of camera 306 can control the length of time that light can enter Camera 306. Where camera 306 is a video camera, Camera 306 can take a series of such images in succession, such as 24 or more frames per second. Each image taken can comprise pixels.

In some example implementations, camera 306 can be a red, green, blue ("RGB") camera, which can be configured to sense three basic color components (e.g., red, green, and blue). Light received can be exposed onto imaging sensors 312, which can comprise charge-coupled devices ("CCDs"), complementary metal-oxide semiconductor ("CMOS"), or other materials. Imaging sensors 312 can convert the light into electrons (e.g., accumulated charge) for each pixel of an image, storing the image. In some implementations Camera 306 can also be other cameras, such as cameras that can measure depth, including ranging cameras, flash lidars, time-of-flight ("ToF") cameras, and RGB-Depth ("RGB-D") cameras. Camera 306 can also comprise other specialized cameras for taking images outside of the visible spectrum, such as infrared cameras, hyperspectral cameras, bi-spectral cameras and other cameras that can image and/or process energy outside of the visible spectrum.

Camera 306 can have a number of physical and performance properties/characteristics. For example, camera 306 can comprise lens 314. Lens 314 can comprise a wide angle lens, standard lens, medium telephoto/portrait lens, telephoto lens, macro lens, fisheye lens, and/or any other lens known in the art. Lens 314 can have a characteristic focal length 316. Focal length 316 can include the distance between lens 314 and image sensor 312 when a subject (e.g., initialization object 150) is in focus. In many cases, focal length 316 can be expressed in millimeters (e.g., 15 mm, 28 mm, 30 mm, 50 mm, 100 mm, 150 mm, 210 mm, 300 mm, or any focal length for a lens). Where lens 314 is a zoom lens, focal length 314 can be adjusted across a range (e.g., 10 mm to 100 mm, etc.). Horizontal angle of view 310 can be the maximum view camera 306 can view through lens 314, and is expressed in degrees. In some cases, the angle of view 310 can change with focal length 316. Horizontal angle of view can be measured in degrees, such as 6, 12, 34, 47, 63, 90, 94, 180 and other degrees. Similarly, camera 306 can have other angles of view, such as angles of view measured in the vertical and diagonal directions, along with horizontal angle of view 310. Together, these angles of view can form a conical, or other, shape shown as field of view 320, an example of which is illustrated in FIG. 3C.

Lens 314 can also have other properties/characteristics, such as an optical center, which can be the point on the principal axis of lens 314 through which light passes without undergoing any deviation. Lens 314 can also have lens distortion effects where images taken by camera 306 using lens 314 can appear to bend and/or have other deviations from their natural appearance. Lens distortion effects can have radial and tangential components. For example, radial distortions can be due to light rays further from the center of lens 314 bending too much compared to light rays that pass closer to the center. Tangential distortion can be due to defects resulting from lens 314 not being exactly parallel to the imaging plane (e.g., the projective plane).

In some implementations, Camera 306 can also have one or more filters that narrow received light to one or more spectral bands. For example, camera 306 can have an infrared filter that allows cameras 306 to image light in the infrared spectrum and may reflect light in other spectrums.

Figure 3C:
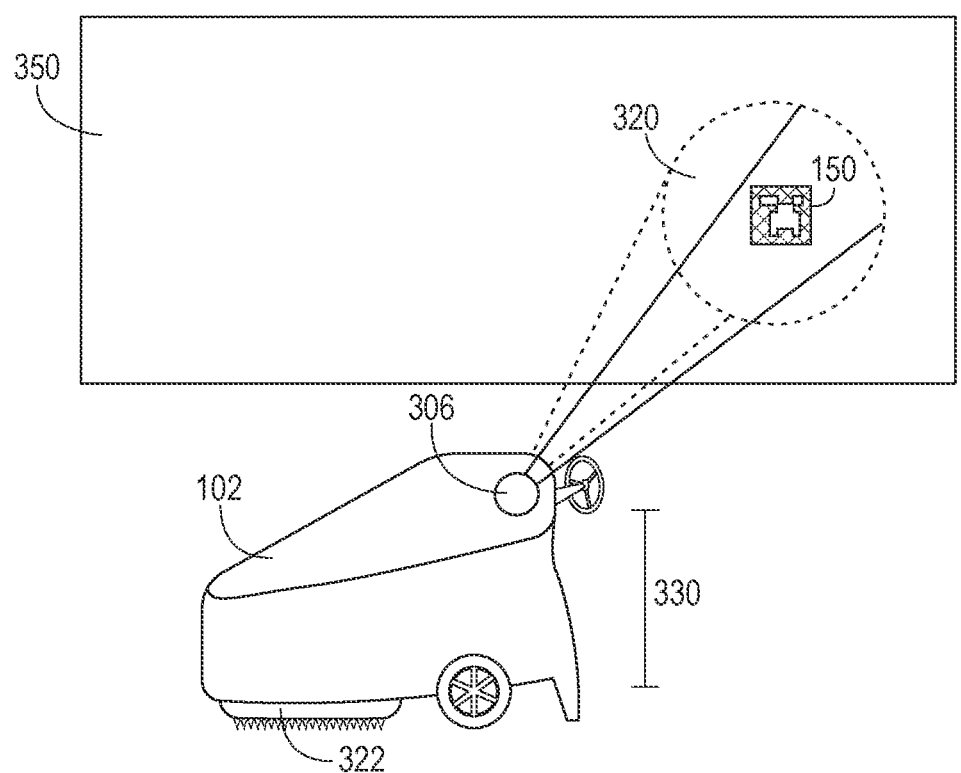
FIG. 3C is a side elevation view illustrating a robot detecting the initialization object from FIG. 3B in accordance with some principles of the present disclosure.

FIG. 3C illustrates a side view of the example robot 102 detecting an initialization object 150. As illustrated, robot 102 can be a floor cleaner (e.g., floor scrubber, vacuum cleaner, sweeper, etc.) configured to clean the floor of a store, warehouse, office building, home, storage facility, etc. Accordingly, robot 102 can have brush 322 configured to clean the floor beneath and/or around robot 102. Brush 322 can be turned on/off by a switch.

Figure 4A:
FIG. 4A illustrates various side elevation views of exemplary body forms for floor scrubbers in accordance with some principles of the present disclosure.

A person having ordinary skill in the art should appreciate that robot 102 can have a number of different appearances/forms, even if robot 102 is a floor scrubber. FIG. 4A illustrates example body forms for a floor scrubber. These are non-limiting examples meant to further illustrate the variety of body forms, but not to restrict robot 102 to any particular body form or even to a floor scrubber. Example body form 402 has an upright shape with a small frame where a user can push behind body form 402 to clean a floor. In some cases, body form 402 can have motorized propulsion that can assist a user in cleaning, but can also allow for autonomous movement of body form 402. Body form 404 has a larger structural shape than body form 402. Body form 404 can be motorized enabling it to move with little to no user exertion upon body form 404 besides steering. The user may steer body form 404 as it moves. Body form 406 can include a seat, pedals, and a steering wheel, where a user can drive body form 406 like a vehicle as body form 406 cleans. Body form 408 can have a shape that is larger than body form 406 and can have a plurality of brushes. Body form 410 can have a partial or fully encased area where a user sits as he/she drives body form 410. Body form 412 can have a platform where a user stands while he/she drives body form 412.

Figure 4B:
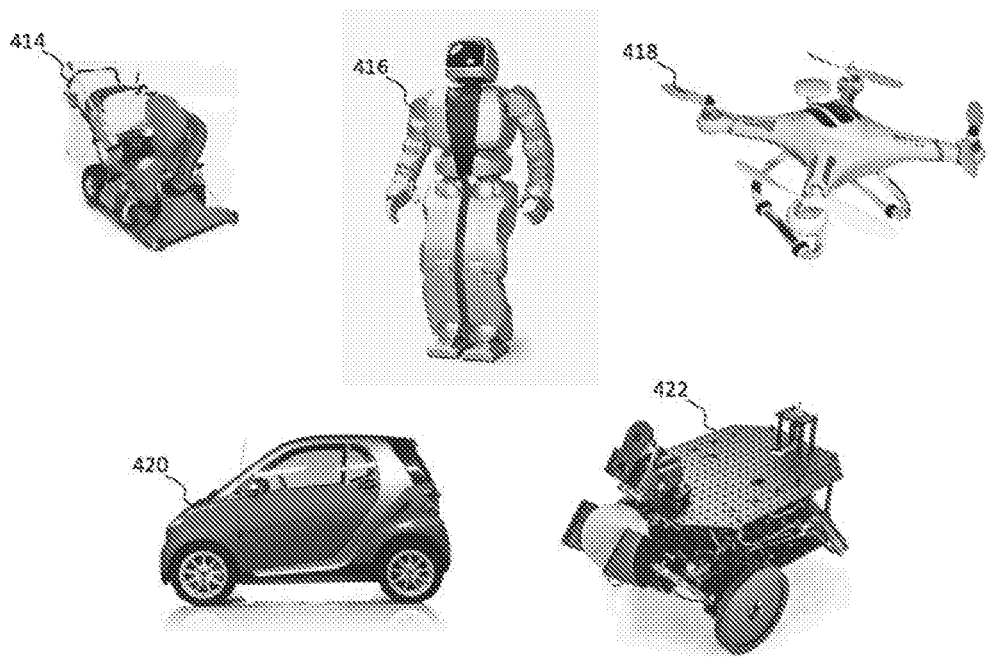
FIG. 4B illustrates various side elevation views of exemplary body forms for a robot in accordance with the principles of the present disclosure.

Further still, as described in this disclosure, robot 102 may not be a floor scrubber at all. For additional illustration, and without limitation, FIG. 4B illustrates some additional examples of body forms of robot 102. For example, body form 414 illustrates an example where robot 102 is a stand-up shop vacuum. Body form 416 illustrates an example where robot 102 is a humanoid robot having an appearance substantially similar to a human body. Body form 418 illustrates an example where robot 102 is a drone having propellers. Body form 420 illustrates an example where robot 102 has a vehicle shape having wheels and a passenger cabin. Body form 422 illustrates an example where robot 102 is a rover.

Returning to FIG. 3C, initialization object 150 in this illustrative example is a sign having an image, such as a distinct picture, positioned on wall 350. However, as noted throughout this disclosure, initialization object 150 is not limited to images, but can include symbols, images, shapes, items (e.g., furniture, statues, appliances, etc.), and/or any other objects.

Initialization object 150 can also include tangible objects, such as chairs, columns, ornaments, etc. Initialization object 150 can include human-readable symbols, such as text. For example, the text can describe characteristics of the initialization object 150 such as the location, an alphanumeric associated with the location (e.g., including locations 1, 2, 3, 4, locations A, B, C, D, locations 1A, 1B, 1C, etc.), a description of the route associated with initialization object 150, and/or any other characteristic and/or aspect of initialization object 150. In some implementations, initialization object 150 can be a screen. For example, the screen can include a display, such as, without limitation, LCDs, LED displays, LED LCD displays, IPS displays, cathode ray tubes, plasma displays, HD panels, 4K displays, retina displays, organic LED displays, touchscreens, surfaces, canvases, screen ink technology, and/or any displays, televisions, monitors, panels, and/or devices known in the art for visual presentation. Advantageously, a screen can display an image that can be changed. This ability to change can give flexibility for a user to change routes and/or other actions initialized by initialization object 150. For example, in some implementations, the image displayed by initialization object 150 can correspond to a particular route. A user 904 can select the image corresponding to a route on the screen of initialization object 150. Then robot 102 can detect the image on the screen. By way of illustration, where robot 102 is learning a route, robot 102 can associate the route with the image it detected on the screen (e.g., that a user 904 created and/or chose from a plurality of routes). Where robot 102 is autonomously navigating a route, it can recall the route associated with the image detected on the screen (e.g., that a user 904 created and/or chose from a plurality of routes). In some implementations, where the screen is a touch screen, a user 904 can draw the image on the screen. For example, user 904 can illustrate any symbols, images, etc. that he/she desires to associate with a learned route, and can later recall the route by later selecting or redrawing that substantially similar symbol, images, etc. In each instance, initialization object 150 can be an object that robot 102 can recognize through sensor 300.

In some implementations, where initialization object 150 is an image, initialization object 150 can be instantiated in the visible spectrum (e.g., visible by a human), as with the case where camera 306 is an RGB camera or it can be instantiated outside of the visible spectrum (e.g., not visible by humans), where camera 306, and/or sensor 300, can detect initialization object 150 using infrared cameras, hyperspectral cameras, and/or other cameras and/or sensors that can image or detect energy outside of the visible spectrum. In some implementations, initialization object 150 can transmit a signal, such as a radio transmission (e.g., BLUETOOTH®) or other signal protocol to enable detection of initialization object 150 by robot 102. In some implementations, initialization object 150 can make a sound, such as a chirp, beep, noise, and/or any other sound. In some cases, the sound can be unique to the initialization object 150, wherein other initialization objects can make other sounds. The sounds can be detected by sensor 300 (e.g., by a microphone), which can use the sound to identify and/or triangulate the location of initialization object 150. In some implementations, initialization object 150 can include both human visible and invisible elements. Advantageously, having both human visible and invisible elements can facilitate a user directing robot 102 to detect initialization object 150. In some cases, the visible portion can be smaller and/or more inconspicuous than the invisible portion. As illustrated, sensor 300 can be positioned at height 330 from the ground, where height 330 can be determined at least in part on the expected position of initialization object 150 and/or where sensor 300 should be in order to capture initialization object 150 within field of view 320.

Figure 5:
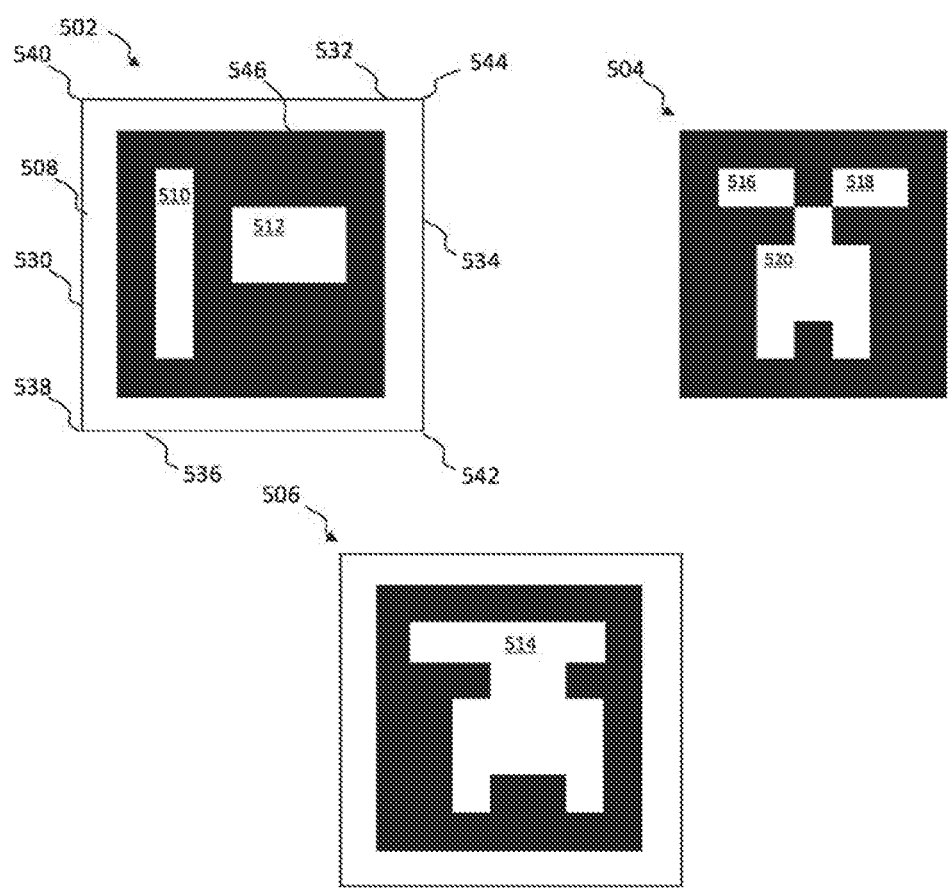
FIG. 5 illustrates various side elevation views of binary images that can be used as initialization objects in accordance with some principles of the present disclosure.

FIG. 5 illustrates example binary images 502, 504, 506 that can be used where example initialization object 150 is a sign having an image. Example binary images 502, 504, 506 are for illustration only and are not meant to limit the image that can be used where initialization object 150 is a sign. For example, initialization object 150 can include any symmetrical or asymmetrical image.

By way of illustration, binary image 502 has a white border 508 framing white shapes 510, 512 with a black background 546. In some cases, white border 508 can give corners and/or edges that can facilitate detection. With white border 508, black background 546 can be more clearly set apart from the surrounding for detection by robot 102. However, some binary images, such as example binary image 504, may not have a border. White shapes 510, 512, in some cases, can be machine-generated blocky shapes, where the shapes are composed of contiguous substantially square and/or rectangular blocks. In some cases, a binary image may have one or more distinct (e.g., not contiguous) shapes. For example, binary image 506 comprises one white shape 514. Binary image 504 comprises white shapes 516, 518, 520.

Using one of binary images 502, 504, 506 as initialization object 150 can be advantageous because each are distinct images that likely would not otherwise appear in a surrounding. Also, because binary images 502, 504, 506, are binary (e.g., black and white), they may be distinct from natural colors that would appear. The blocky white shapes and binary colors of images 502, 504, 506 also make them easily detectable using a low resolution RGB camera as camera 306. Also, binary images 502, 504, 506 lack rotational symmetry such that the rotation of initialization object 150 can also be detected. The general detectability of binary images 502, 504, 506 can allow robot 102 to detect any one of binary images 502, 504, 506 with low hardware costs (e.g., cheaper components) and lower processing costs (e.g., involves relatively little computing power). Moreover, binary images 502, 504, 506 can be low cost to make and have many combinations, many of which can be randomly generated by a computer. Having many combinations can allow different binary images to be placed at different locations associated with different navigable routes.

Initialization object 150 can have a plurality of sides and corners, including right side, left side, top side, bottom side, top left corner, top right corner, bottom left corner, bottom right corner, or any other relative designation of any side, corner, and/or edge. By way of illustrative example, binary image 502 can have left side 530, right side 534, top side 532, and bottom side 536 as it is illustrated. Binary image 502 can also top left corner 540, top right corner 544, bottom left corner 538, and bottom right corner 542.

As mentioned, initialization object 150 can include other images besides binary images (e.g., binary images 502, 504, 506). For example, initialization object 150 can be substantially similar to binary images (e.g., binary images 502, 504, 506), except using different colors besides black and/or white, or a plurality of colors, including colors viewable in the visible spectrum and/or colors not in the visible spectrum (e.g., viewable by machines or under machine-aid using UV, IR, etc.). Advantageously, colors not viewable in the visible spectrum can reduce and/or prevent undesirable viewing by humans of the initialization object. In some implementations, initialization object 150 can be an image of a scene, object, person, etc. In any case, as also previously described in this disclosure, initialization object 150 can be any image, sign, object, and/or any object that can be recognized by a computer.

Figure 6:
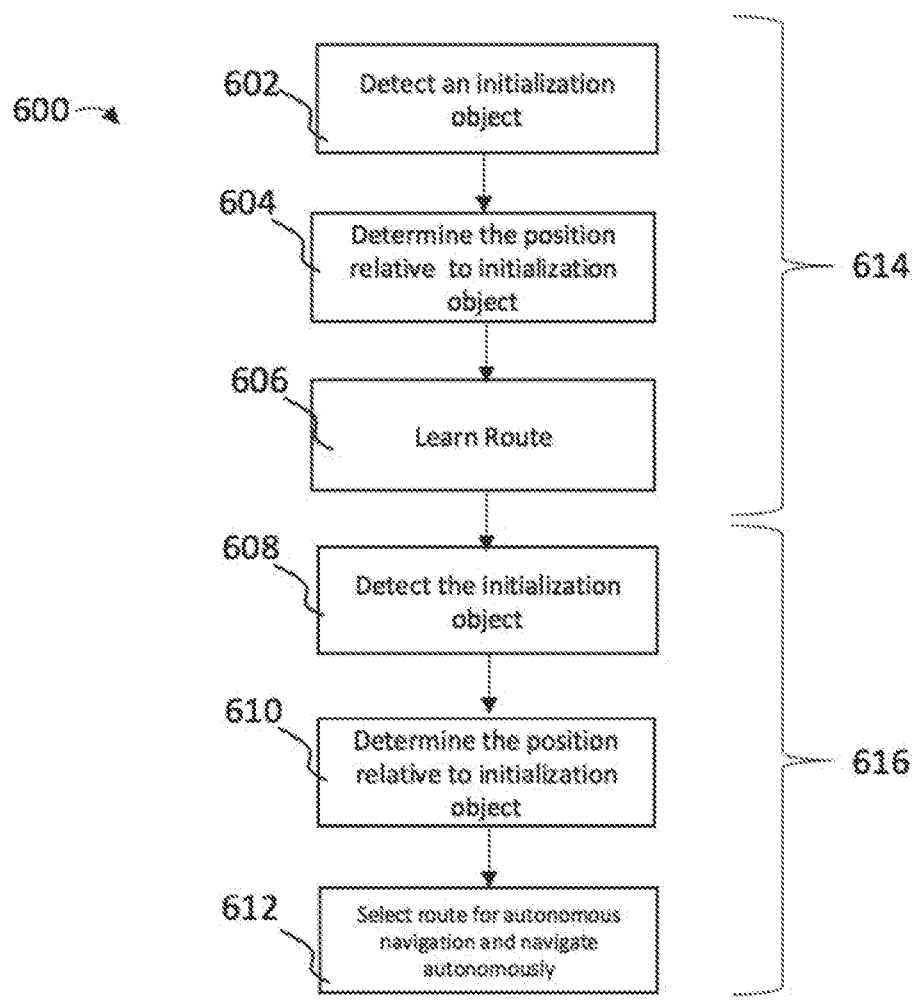
FIG. 6 is a process flow diagram of an exemplary method in which a robot can be initialized to autonomously navigate a learned route in accordance with some implementations of the present disclosure.

FIG. 6 illustrates a process flow diagram of an example method 600 where robot 102 can be initialized to autonomously navigate a learned route. For example, in portions 602, 604, 606 in teaching phase 614, robot 102 can learn route 116 demonstrated by user 904. Subsequently, in portions 608, 610, 612 in autonomous navigation phase 616, robot 102 can autonomously navigate route 116 as routes 106, 126 or substantially similar routes.

Portion 602 can include robot 102 detecting initialization object 150. This first detection of initialization object 150 can begin the initialization process for robot 102. The appearance of initialization object 150 using exteroceptive sensor 300 can be stored in memory 302 in order for robot 102 to identify initialization object 150. For example, where initialization object 150 is a binary image (e.g., one of binary images 502, 504, 506), the binary image can be stored in memory 302.

In some implementations, sensor 300 can sense its surrounding (e.g., within the angles of view of sensor 300) and controller 304 can process the data obtained from sensor 300 and analyze that data to detect initialization object 150. For example, where sensor 300 includes camera 306, camera 306 can take images of its surrounding (e.g., single images and/or a sequence of images in a video). Controller 304 can analyze each taken image (e.g., images taken by sensor 300 (e.g., camera 306)), and analyze those taken images for initialization object 150. With binary images (e.g., binary images 502, 504, 506), the analysis can comprise image processing. By way of illustration, controller 304 can take a taken image from camera 306 and perform a sequence of image processing techniques to make the binary image detectable.

In some implementations, library 324 can comprise one or more images of initialization object 150 and/or substantially similar objects that can be used to identify initialization object 150 in a taken image. For example, library 324 can be used in a supervised or unsupervised machine learning algorithm for controller 304 to learn to identify initialization object 150 in taken images. For example, the location of initialization object 150 and/or substantially similar objects can be identified in one or more images in library 324 (e.g., labelled by a user (e.g., hand-labelled) or automatically, such as with a computer program that is configured to generate/simulate library images of initialization object 150 and/or a substantially similar object and/or label those library images). In some implementations, these images in library 324 can include images of initialization object 150 and/or substantially similar objects in different lighting conditions, angles, sizes (e.g., distances), clarity (e.g., blurred, obstructed/occluded, partially off frame, etc.), colors, surroundings, etc. From these images in library 324, controller 304 can first be trained to identify initialization object 150 and/or substantially similar objects in many different situations, and then use that training to identify initialization object 150 in a given taken image.

In some implementations, controller 304 can compare taken images to labelled images in library 324. Where there is a substantial match between the taken image and one or more images in library 324, controller 304 can then identify initialization object 150 based at least in part on the one or more images of initialization object 150 and/or substantially similar objects labelled in library 324.

In some implementations, the amount of match between a taken image and one or more images in library 324 can be determined by comparison. For example, the difference between the taken image and one or more images from library 324 can be taken. This difference can be represented at least in part in a differential image. The differential image can then be evaluated to determine the degree of similarity between the taken image and the one or more images form library 324. By way of illustration, controller 304 can take the sum (e.g., arithmetic sum, sum of the absolute values, etc.) of a plurality of pixels of the differential image and compare that sum to a predetermined threshold, where the predetermined threshold can be determined based at least in part on the robustness and tolerance of false positives. If the sum of the differences exceeds the predetermined threshold, controller 304 can determine that there has not been a match because the difference is too great. As another example, an image comparator can be used that executes methods of comparing images to determine their similarities, and in some cases, the percentage similarity. These comparators can analyze the taken image and the one or more images from library 324 pixel-by-pixel, region-by-region, and/or based on shapes or distinct features of the images to look for similarities and/or differences.

In some implementations, library 324 of images of initialization object 150 and/or substantially similar objects can be used along with other image processing techniques to search each taken image for initialization object 150. For example, in some implementations, controller 304 can perform border following and/or contour tracing to extract boundaries in a taken image. The borders of initialization object 150 can be particularly easy to detect where initialization object 150 contrasts from its surrounding. For example, where initialization object 150 has unique patterns or colors from its surrounding, initialization object 150 can contrast from its surroundings and its border can be readily identified. By way of illustrative example, the black and white colors of a binary image (e.g., binary images 502, 504, 506) can stand out and contrast with surroundings in many environments.

In some implementations, controller 304 can perform segmentation on a taken image. For example, where initialization object 150 is a binary image, adaptive thresholding can segment the binary images. Advantageously, segmentation can reduce false positives and reduce noise in the taken image. The taken images, after and/or before segmentation, can also be further cleaned up with morphological image processing (e.g., erosion and dilation to remove noise), filters, etc. In some cases, where the shape of initialization object 150 is distinct (e.g., square and/or rectangular like binary images 502, 504, 506), objects that are not substantially the same shape (or distorted/transformed versions of the shape as might be seen from a variety of angles of imaging) can be removed from the taken image. For example, where initialization object 150 is square and/or rectangular, objects in the taken image that are not concave contours and/or objects with four distinct corners may be ignored and/or removed from the processing. Then, one or more images of library 324 can be used to detect initialization object 150 in the taken image by comparison. In some cases, the exact pattern of white shapes (e.g., white shapes 516, 518, 520) within each binary image in the taken image obtained by camera 306 can be compared by controller 304 to one or more images of library 324. In this way, the presence and location of initialization object 150 can be identified in the taken image.

In some implementations, there may be a plurality of initialization objects. In some cases, the plurality of initialization objects can each be indicative of different initial locations for learning routes and autonomously navigating routes. For example, different initialization objects can be used on different floors of a building, wherein robot 102 travels different routes on different floors based at least in part on detection of those different initialization objects. As another example, different initialization objects can be on the same floor, but represent at least in part of different initial locations and different routes, accordingly, that robot 102 can travel. As such, it can be advantageous for the different initialization objects to have distinct appearances to avoid misidentification. In the case of binary images, the pattern of white shapes can be different between each initialization object.

In some implementations, detection of initialization object 150 can be paired with detections by other sensors. Advantageously, using detections by other sensors can account for situations where initialization object 150 is moved and/or where the environment has changed significantly. This use of other sensors can provide for signal redundancy and/or enhanced safety. By way of illustration, another sensor can be a laser scan lidar configured to image a scene. In some cases, the image can be a 3D image or a 2D image compressed from the data obtained from the scan lidar. One or more scan lidar images can be associated with a valid detection of initialization object 150. In these cases where detection of initialization object 150 is paired with detections by other sensors, robot 102 can both determine if initialization object 150 has been detected and if the scan lidar image is substantially similar to the one or more scan lidar images associated with detection of initialization object 150. In this way, robot 102 (e.g., controller 304 of robot 102) can verify initialization object 150 using the scan lidar image.

Figure 7:
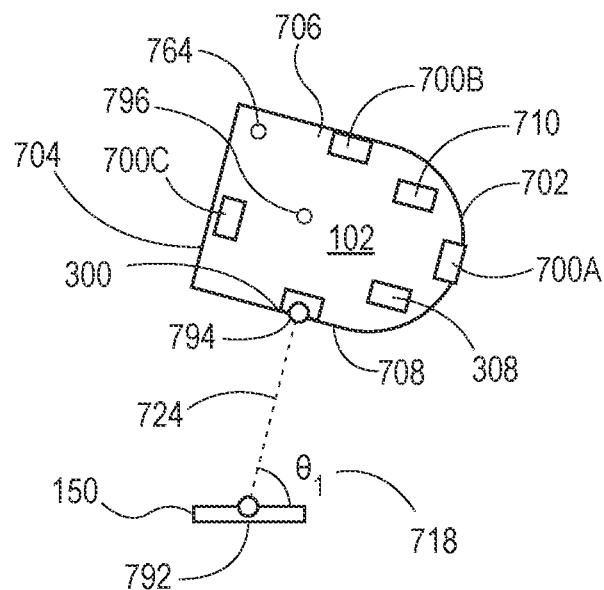
FIG. 7 is an overhead view of a robot positioned at an angle to an initialization object, where a sensor of the robot measures a distance and angle from an example point on the sensor to a point on the initialization object in accordance with some implementations of the present disclosure.

Portion 604 can include robot 102 determining its position (e.g., where position includes robot's location, displacement and/or orientation, and can sometimes be interchangeable with the term pose as used herein) to initialization object 150 detected in portion 602. By way of illustrative example, FIG. 7 illustrates an overhead view of example robot 102 positioned at an example angle to example initialization object 150, where example sensor 300 measures an example distance 724 and example angle 718 from example point 794 on example sensor 300 to example point 792 of example initialization object 150. Point 796 can be another point positioned on robot 102, such as the center, center of mass, position on another sensor (e.g., a point on proprioceptive sensor 308), or any other point on robot 102.

Point 792 can be a reference point on initialization object 150. For example, point 792 can be the center (e.g., the midpoint on the vertical and horizontal directions of initialization object 150), corner point (e.g., top left corner (e.g., top left corner 540 of binary image 502), top right corner (e.g., top right corner 544 of binary image 502), bottom left corner (e.g., bottom left corner 538 of binary image 502), bottom right corner (e.g., bottom right corner 542 of binary image 502), edge midpoint (e.g., midpoint of the right side (e.g., right side 534 of binary image 502), midpoint of the left side (e.g., left side 530 of binary image 502), midpoint of the bottom side (e.g., bottom side 536 of binary image 502), midpoint of the top side (e.g., top side 532 of binary image 502)), or any position disposed on and/or in initialization object 150. Point 794 can be a part of the measuring system of sensor 300, such as the center (e.g., physical center and/or optical center) of lens 312 or any other point on and/or in sensor 300.

As illustrated, robot 102 can include a body with a plurality of sides, such as front side 702, right side 708, left side 706, and back side 704. Robot 102 can also have a top side 764 and a bottom side (not pictured). A person having ordinary skill in the art should appreciate that robot 102 can have other sides as well, corresponding to the surfaces of robot 102, which can vary by shape (e.g., rectangular, pyramidal, humanoid, or any designed shape). By way of illustration, front side 702 can be positioned on the forward-facing side of robot 102, where the forward-facing side is forward in the direction of forward movement of robot 102. Back side 704 can be positioned on the backward-facing side of robot 102, where the backward-facing side is the side facing in substantially the opposite direction of the forward facing side, such as front side 702. Right side 708 can be the right-hand side relative to front side 702, and left side 706 can be the left-hand side relative to front side 702. As illustrated in FIG. 7, robot 102 can have additional sensors, such as additional exteroceptive sensors 700A-700C, which can be substantially similar to exteroceptive sensor 300 or any other sensor, and additional proprioceptive sensor 710, which can be substantially similar to proprioceptive sensor 308 or any other sensor. Accordingly, robot 102 can utilize one or more sensors (e.g., sensors 300, 700A-700C) to detect and/or initialize robot 102 to initialization object 150. For example, where initialization object 150 is positioned proximally to one or more of right side 708, left side 706, front side 702, back side 704, top side 764, or a bottom side, a sensor positioned on and/or around those sides can be used to detect initialization object 150 and determine robot 102's position relative to initialization object 150. In some cases, it might be advantageous to position robot 102 in a convenient location relative to initialization object 150 to begin navigation. For example, having initialization object 150 proximal to right side 708 or left side 706, where robot 102 is facing the direction it is going to navigate a route, can allow robot 102 to minimize maneuvering (e.g., turning around) before navigating. In some cases, initialization object 150 can be positioned on a ceiling.

Robot 102 can measure a distance 724 between point 794 and point 792, which can be an absolute distance measurement using standard units, such as inches, feet, meters, or any other unit of measurement (e.g., measurements in the metric, US, or other system of measurement). In some implementations, distance 724 can be measured in relative and/or non-absolute units, such as ticks, pixels, percentage of range of a sensor, and the like. In some implementations, distance 724 can be expressed in x- and y-coordinates relative to an origin, such as point 792, point 794, point 796 or any other determined location. In such cases, the x-coordinate can be the distance to the origin to a first axis, and the y-coordinate can be the distance to the origin in a second axis, the second axis orthogonal to the first forming a rectangular coordinate system. Accordingly, distance 724 can be the difference between the x-coordinates and y-coordinates of point 792 and point 794. In some cases, distance 724 can be expressed in three dimensions, including the aforementioned x- and y-coordinates, and a z-coordinate, where the z-coordinate can be the distance to the origin in a third axis.

Robot 102 can also approximate its orientation. In some implementations, robot 102 can approximate the relative angle 718 between point 794 and point 792. Angle 718 can be measured in degrees, radians, or any unit. In some implementations, angle 718 can be measured relative to a 2D plane, such as a horizontal plane (e.g., the aforementioned rectangular coordinate system of distance 724 or other measurements). In some implementations, additional angles can be measured, such as one or more of roll, yaw, and, pitch of point 792 to point 794. Accordingly, the determination by robot 102 of position relative to initialization object 150 can include determining a distance from a point on robot 102 to a point on initialization object 150 as well as an orientation between those points.

In some implementations, in order to determine the position of point 794 relative to point 792, robot 102 can identify properties/characteristics of sensor 300 that detected initialization object 150. In some implementations, these properties/characteristics can be represented as calibration parameters detailing aspects of sensor 300.

By way of illustrative example, where sensor 300 includes camera 306, properties/characteristics of camera 306 can be determined as calibration parameters. These calibration parameters can include focal length, distortion, angle of view, distortion effects, aspect ratio, height above ground, etc. These calibration parameters can be known by a user based on specifications of camera 306 and/or the set-up/positioning of camera 306. For example, lens 314 and camera 306 can be manufactured to specifications that can be known to robot 102 (and/or any of its components and/or subcomponents) or a user. In some cases, a user 904 of robot 102 can measure such calibration parameters, such as by measuring the height camera 306 is from the ground.

Figure 8:
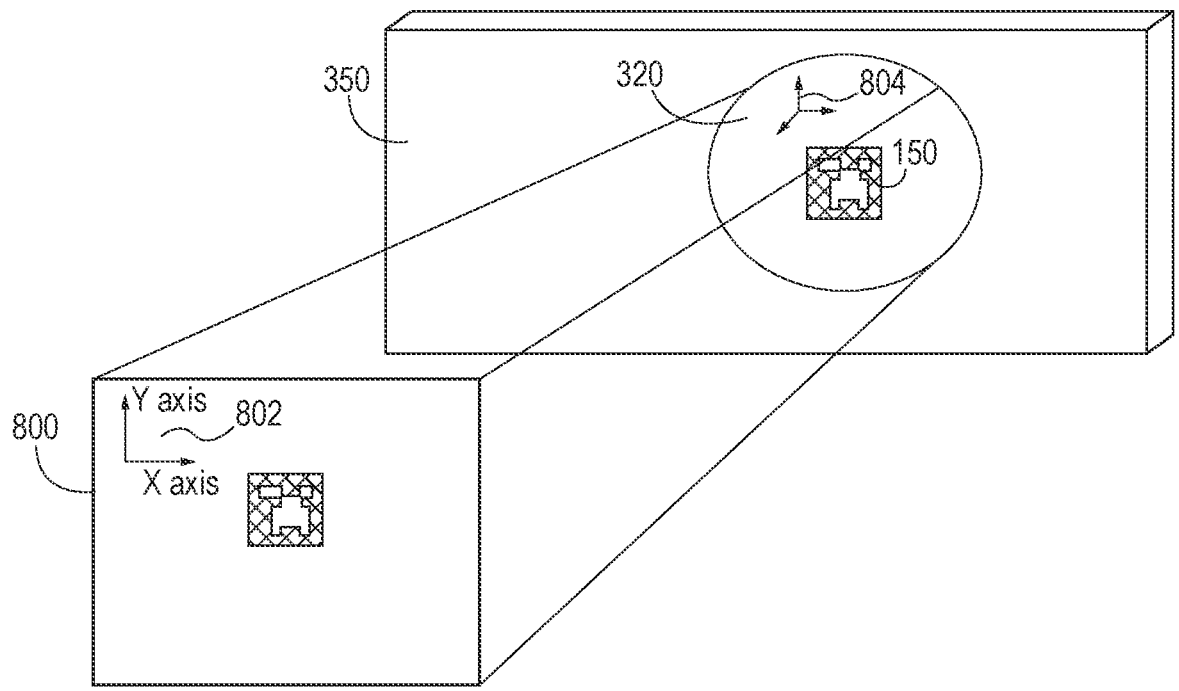
FIG. 8 is a side elevation view of an image representation of an initialization object in accordance with some implementations of the present disclosure.

In some cases, one or more of the properties/characteristics of camera 306 (including lens 314) can be estimated from one or more images taken by camera 306. For example, there can be known relationships between images taken by camera 306 and the properties/characteristics of camera 306. By way of illustrative example, FIG. 8 illustrates an example initialization object 150 being represented in an example image 800. In some cases, camera 306 can take image 800 of a scene including objects such as initialization object 150. Initialization object 150 (as illustrated as an example sign with a binary image on wall 350 in FIG. 8), is in three-dimensional space having coordinates (x, y, z) in coordinate system 804. The scene in field of view 320 can be captured in image 800 in two-dimensional space having coordinates ($x_{image}$, $y_{image}$) in coordinate system 802. Accordingly, at least some of the coordinates in the scene can be captured in image 800 at pixel locations with coordinates ($x_{image}$, $y_{image}$), where $x_{image}=f_x(X/Z)+c_x$ and $y_{image}=f_y(Y/Z)+c_y$, where $f_x$ and $f_y$ can be focal lengths in the $x_{image}$ and $y_{image}$ directions, respectively. The constants $c_x$ and $c_y$ can be the displacements, from the optical axis, of the center of coordinates on the image 800 in the $x_{image}$ and $y_{image}$ directions, respectively. Knowing these relationships can allow calibration of camera 306, such as computer-implemented calibration, so that distorted images can be corrected. These relationships and ways to calibrate them are discussed in J. Heikkila and O. Silven, "A four-step camera calibration procedure with implicit image correction," Computer Vision and Pattern Recognition, 1997. Proceedings, 1997 IEEE Computer Society Conference on, San Juan, 1997, pp. 1106-1112, which is incorporated herein by reference in its entirety, as well as elsewhere in the art. There can be other systems and methods for finding calibration parameters from image 800 and/or calibrate camera 306. Implementations of this disclosure are not limited to any particular system or method. It should be noted that not all coordinates in field of view 320 may appear in image 800. For example, only a portion of field of view 320 may appear as image 800. As illustrated in FIG. 8, field of view 320 is illustrated as circular, whereas image 800 is rectangular. Image 800 represents a rectangular portion of field of view 320 in the illustrated non-limiting example. A person having ordinary skill in the art should appreciate that image 800 is for illustrative purposes, and image 800 could comprise other views having different characteristics (e.g., angles, lighting, distortions, obstructions/occlusions, partial pictures, etc.) than as illustrated.

The estimation of position of point 794 (and/or point 796) to point 792 can then utilize pose estimation systems and methods. For example, such pose estimation systems and methods can include analytic or geometric methods and/or learning-based methods.

For example, where analytic or geometric methods are used, the location of each 2D point in an image 800 can be treated as a mapping from the 3D scene (e.g., the scene in field of view 320) to the 2D image. In this way, initialization object 150 can be projected onto the image 800. Because the calibration parameters of camera 306 and the geometry of initialization object 150 can be also known, a function relating the 3D points in the scene including initialization object 150 to a 2D image 800 can be found. There are many such functions, some of which are known in the art. For example, a projective camera model can take the form P~CS where, P is a matrix representative of 2D points (e.g., pixels) in an image, S is a matrix representative of 3D points in a scene, C is the camera matrix, and indicates at least in part that the left and right hand sides of the equation are equal up to a non-zero scalar multiplication.

In some cases, C can comprise, among other things, values based at least in part on the various calibration parameters of camera 306, such as one or more of focal length, tangential and radial distortion coefficients, optical center, aspect ratio, etc. In some cases, C itself can be represented as the product of multiple matrices. For example, in some cases, C=A[R t], where A is a camera intrinsic matrix (e.g., containing characteristics of camera 306) and [R t] includes extrinsic parameters (expressed in matrix form) such as the rotation and translation relating the scene coordinates (e.g., coordinate system 804) to the 2D image coordinates (e.g., coordinate system 802). The rotation R and transition t can give the position of initialization object 150. Thus, estimating [R t] based at least in part on known camera intrinsics and locations of initialization object 150 in an image 800 can allow robot 102 to find the position of robot 102 relative to initialization object 150. For example, in some implementations, A can be a 3×3 matrix expressed as:

$$A = \begin{bmatrix} \alpha f & \gamma & \mu_0 \\ 0 & \beta f & v_0 \\ 0 & 0 & 1 \end{bmatrix}$$

In the above matrix for A, ($\mu_0$, $v_0$) can be coordinates of the principal point (e.g., image center and/or optical center in the coordinate system ($x_{image}$, $y_{image}$)), $\alpha$ and $\beta$ can be scale factors in the image $i_{image}$ and $y_{image}$ axes respectively, f can be the focal length, y can be representative of the skewness of the axes of the image coordinates. R can be a 3×3 rotation matrix and t can be a 3-dimensional translation vector. Thus, in some implementations, $$[Rt] = \begin{bmatrix} R_{11} & R_{12} & R_{13} & T_X \\ R_{21} & R_{22} & R_{23} & T_Y \\ R_{31} & R_{32} & R_{33} & T_Z \end{bmatrix}$$

In some implementations, t can be the position of the origin of the scene coordinate system (e.g., coordinate system 804) expressed in coordinates of a 3D camera-centered coordinate system, where the aperture of lens 314 of camera 306 can be the origin. Using a transformation, the translation t can be transformed into scene coordinates. In some cases, M can be a column vector describing the location of the aperture of lens 314 in scene coordinates. $R_C$ can be camera 306's orientation with respect to the scene coordinate axes, and $R_C = R^T$, where $R^T$ is the transpose of matrix R. Accordingly, in some implementations, the translation vector can be expressed as a product of M by the relationship t=−RM.

In some implementations, controller 304 can thus solve expressions of the form P~CS for one or more of $R_C$, M, R, t, or any other parameter, thus finding the position of camera 306 in scene coordinates (e.g., where the coordinates can be centered at a point, such as one of points 792, 794, 796 or another point on initialization object 150, robot 102, or elsewhere in the environment). Controller 304 can solve for the position using known mathematical methods, including Direct Linear Transformation ("DLT") and others. Distortion (e.g., radial and/or translational) of lens 314 can also be factored in non-linear models, where the non-linear models can be solved by nonlinear estimation techniques.

A person having ordinary skill in the art, given the contents of the present disclosure, would appreciate that other camera models can be used, including other pinhole camera models and/or other models for 3D to 2D projection known in the art. These models can then be solved based to find the position/pose of camera 306 relative to a point (e.g., point 792, point 794, or point 796) in the scene coordinate system (e.g., coordinate system 804).

As another illustrative example, learning-based methods can be used by robot 102 to find the position of one or more of points 794, 796 to point 792, as illustrated in FIG. 7. By way of illustrative example, library 324 can comprise example images of initialization object 150 and/or substantially similar objects depicting at least in part initialization object 150 and/or substantially similar objects at various positions (e.g., distances in a coordinate system and/or orientations/angles). Library 324 can then be used in a supervised or unsupervised machine learning algorithm for controller 304 to learn to identify/associate the position of one or more of points 794, 796 to point 792 from taken images (e.g., image 800). The images of library 324 can be identified (e.g., labelled by a user (e.g., hand-labelled) or automatically, such as with a computer program that is configured to generate/simulate library images of initialization object 150 and/or a substantially similar object and/or label those library images) with their respective corresponding measured positions of one or more of points 794, 796 to point 792. In some implementations, library 324 can also include images of initialization object 150 and/or substantially similar objects in different lighting conditions, angles, sizes (e.g., distances), clarity (e.g., blurred, obstructed/occluded, partially off frame, etc.), colors, surroundings, etc. From these images, controller 304 can first be trained to identify the position of one or more of points 794, 796 to point 792 based at least in part on the corresponding images of initialization object 150 and/or substantially similar objects in many different situations in library 324. Robot 102 can then use that training to identify the position of one or more of points 794, 796 to initialization object 150 in a taken image.

In some implementations, controller 304 can process each taken image (e.g., image 800) and compare the taken image to one or more images in library 324 (e.g., a library image). In some cases, where a taken image substantially matches (e.g., using any of the matching systems and methods previously described with reference to portion 602) an image or plurality of images in library 324, controller 304 can identify the position of one or more of points 794, 796 to point 792 from the taken image as substantially the same as the position associated with the matched image or plurality of images from library 324. In some cases, where the taken image does not substantially match an image in library 324, controller 304 can estimate the position of one or more of points 794, 796 relative to point 792 based at least in part on similar images in library 324 that may not be exact matches. In some cases, controller 304 may average (and/or perform other statistical estimations based at least in part upon) a plurality of positions corresponding to similar images in library 324 to provide an estimate of the position of one or more of points 794, 796 to point 792 on the taken image.

As a result, from any system or method used in portion 604, robot 102 can determine the position of one or more of points 794, 796 relative to point 792. In some cases, where the position of point 794 relative to point 792 is known, the position of point 796 relative to point 792 can also be found. For example, because the positioning of point 794 to point 796 can be measured (e.g., in x, y, z coordinates and/or the angles), the position of point 796 to point 792 can also be found. By way of illustration, the position of point 796 relative to point 792 can be calculated based at least in part on the position of point 794 to point 792 using arithmetic, such as by adding the angle and/or the difference in x-, y-, and/or z-coordinates between point 796 and point 794 to the position of point 794 relative to point 792.

In some implementations, the origin of the scene coordinate system can be taken to be point 792, point 794, point 796, or any other point. Advantageously, identifying point 792 as the original can provide a potentially stationary object as the origin, which can supply consistency between the origin for routes 106, 116, 126, and/or any other route navigated from an initialization location relative to initialization object 150.

With the position of one or more of points 794, 796 to point 792 known, robot 102 can also initialize its odometry in odometry unit 326. In some cases, robot 102 can initialize proprioceptive sensor 308. For example, knowing the initial position of one or more of points 794, 796 to point 792 can allow robot 102 to know its initial location. It can then track other positions to which it moves relative to the initial location and/or point 792. This can allow robot 102 to determine one or more of its travelled positions on demonstrated route 116, as well as when it is autonomously navigating, such as on routes 106, 126.

Figure 9A:
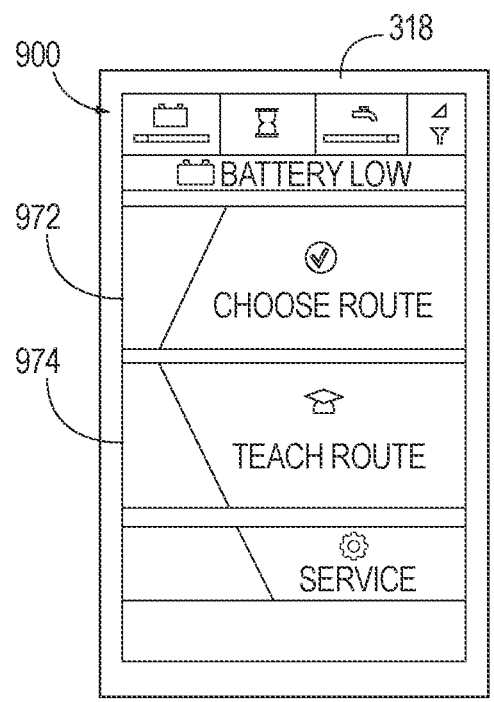
FIG. 9A is an example user interface for receiving an input from a user to begin learning a route or to choose a route for navigation in accordance to some principles of the present disclosure.

Returning to FIG. 6, portion 606 can include robot 102 learning a route. In some implementations, a user 904 can initiate route learning, such as by instructing robot 102 to learn a route through example interface 900. FIG. 9A illustrates an example interface 900 for receiving an input from a user to begin learning (e.g., from teaching by a user 904) a route or to choose a route. For example, a user 904 can select input 972 on interface 900 on user interface 318, where input 972 can allow a user to select a recorded route of robot 102. In some implementations, robot 102 can automatically begin learning a route by virtue of detecting initialization object 150. For example, where robot 102 has no routes stored in memory 302, it can automatically begin learning whatever actions and/or route user 904 performs, and the positions and/or trajectories of those actions relative to initialization object 150 and/or any other point described in this disclosure.

Figure 9B:
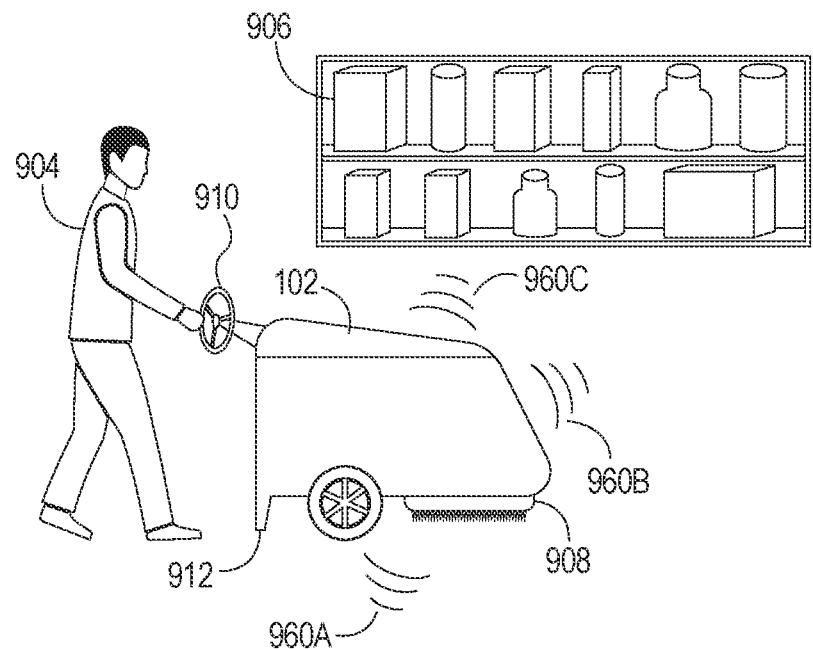
FIG. 9B is a side elevation view of a user controlling a robot while teaching a route in accordance with some principles of the present disclosure.

Based at least in part on user 904's input, robot 102 can initialize route learning. Robot 102 can begin learning a route from the initial location where robot 102 detected initialization object 150. By way of illustrative example, FIG. 9B illustrates a side view of user 904 controlling robot 102 while teaching a route. User 904 can be a janitor, custodian, and/or any person or robot who can use robot 102. As illustrated, robot 102 can be a floor cleaner configured to clean the floor of a store, warehouse, office building, home, storage facility, etc. Accordingly, robot 102 can have brush 908 and squeegee 912 configured to clean the floor beneath and/or around (e.g., within the reach of brush 908 and squeegee 912) robot 102.

User 904 can demonstrate route 116 (illustrated in FIG. 1B) to robot 102. Along that route, robot 102 can also learn actions and/or actuator instructions associated with positions (e.g., relative to a reference point, such as one or more of points 792 or any other point) and/or trajectories (e.g., while moving in a certain direction or in a particular sequence along route 106) along route 116, such as actuation of brush 908 to clean the floor. Robot 102 can be configured in any number of ways for control by user 904. As illustrated, user 904 can walk behind robot 102 and/or steer robot 102 using steering wheel 910 as robot 102 moves forward under motorized power. In other implementations, robot 102 can be a ride-on floor cleaner (not pictured) where user 904 can ride on a seat or standing platform of robot 102 and control it. In some implementations, user 904 can control robot 102 remotely with a remote control, such as a radio remote, mobile device, joystick, and/or any other apparatus for navigation known in the art. This control can include turning left, turning right, moving forward (e.g., using a gas pedal or telling robot 102 to go in a forward direction), moving backwards (e.g., using a reverse pedal or telling robot 102 to go in a backward direction), turn on/off, raise/lower brush, turn on/off water, etc. In some implementations, user 904 may control one or more actuators, which can control instruments of robot 102, such as such as turning on/off water, spraying water, turning on/off vacuums, moving vacuum hose positions, gesticulating an arm, raising/lowering a lift, turning camera 306, actuating sensors 300, 308, 700A-700C, etc. Robot 102 can also learn the control of such instruments relative to its route 116 (e.g., robot 102's position and/or trajectories along route 116). For example, where robot 102 is a floor cleaner learning route 116, robot 102 can also learn when along route 116 to actuate these various instruments on robot 102, such as brush 908 and/or squeegee 916. In some implementations, where actions and/or actuator instructions are associated with positions and/or trajectories, while autonomously navigating, robot 102 can perform those actions and/or actuator instructions when it is passes by a position, and/or in some cases, when it passes by that position in the same direction and/or at the same relative time as a learned route. Accordingly, in these implementations, robot 102 would not perform those actions and/or actuator instructions each time it passes a position (e.g., where it loops around and passes the same physical location multiple times), but only perform such actions and/or such actuator instructions when it passes by the location either in a particular direction or at particular instance(s) in the route.

Robot 102 can then store route 116, and any associated actions along route 116, in memory 302, including robot 102's positions and/or trajectories measured along locations of route 116. Robot 102 can also use one or more of sensors 300, 700A-700C to record sensed objects (e.g., object 906) in the surrounding of robot 102. For example, one or more sensors 300, 700A-700C can emit energy waves 960A-C to detect objects around robot 102. In this way robot 102 can both use its odometry (e.g., with proprioceptive sensor 308 of odometry unit 326) and its exteroceptive sensors (e.g., exteroceptive sensors 300, 700A-C) to sense its surrounding while learning route 116. For example, robot 102 can learn any controls in relationship to its position and/or trajectory with respect to point 792. By way of illustration, robot 102 can learn to turn at certain positions, and/or when it goes to certain positions in certain directions and/or at certain points relative to the learned route. Robot 102 can learn to actuate brush 908 when at certain positions, and/or when it goes to certain positions in certain directions and/or at certain points relative to the learned route. Robot 102 can learn to associate any sort of action with particular positions and/or trajectories relative to point 792 or any other point. Sensors 300, 700A-700C can detect objects which can both allow robot 102 to map the location of those objects on a map stored in memory 302 and/or avoid objects it comes across. Robot 102 can map environment 100 and/or route 116 using Simultaneous Localization and Mapping ("SLAM"), augmented reality, scale-invariant feature transform ("SIFT"), and/or other systems and methods.

As mentioned, while demonstrating route 116, user 904 can begin at an initial location relative to initialization object 150 and end at end location 114. In this way, user 904 can demonstrate the whole of route 116. In some implementations, end location 114 can be determined by detection of initialization object 150 or a different initialization object. In this way, the position of robot 102 at end location 114 can be verified at end location 114. Advantageously, by verifying the position of robot 102 at end location 114, robot 102 can compare robot 102's odometry to the verified position and determine the drift of the odometry. This can facilitate identification and correction of errors as robot 102 maps the environment and/or routes. Where robot 102 detects initialization object 150 at both the initial location and end location 114, robot 102's route may be substantially a closed loop.

Returning back to FIG. 6, portion 608 includes detecting initialization object 150 again. This second detection can coincide with a second placement of robot 102 into an initial location relative to initialization object 150. This detection can occur at a later point in time after portion 606, such as substantially right after the demonstration of portion 606, or at some later time, such as hours later, days later, weeks later, or whenever the user 904 desires to clean the floor. In portion 608, robot 102 can detect initialization object 150 in a substantially similar way to how robot 102 detected initialization object 150 with respect to portion 602.

Then, portion 610 can include robot 102 determining robot 102's position with respect to initialization object 150 (e.g., point 792) detected in portion 608 substantially similar to the way robot 102 determined its position to initialization object 150 detected in portion 602.

Figure 10:
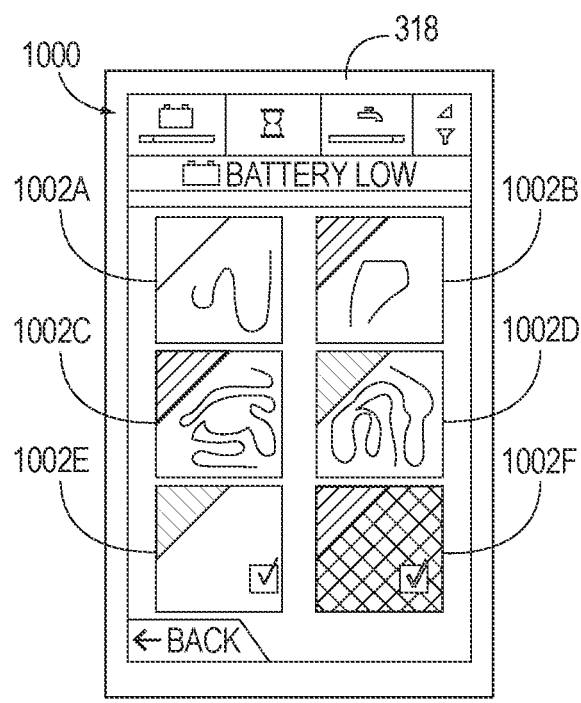
FIG. 10 is an example user interface, which can be used for route selection in accordance with some principles of the present disclosure.

Portion 612 can include robot 102 selecting a recorded route to navigate autonomously. In some implementations, the selection of the recorded route (e.g., route 116) by robot 102 can be based at least in part on user input. For example, a user 904 can select input 972 on user interface 900 (illustrated in FIG. 9A) on user interface 318, where input 972 can allow a user to select a recorded route of robot 102. After selecting input 972, interface 1000, illustrated in FIG. 10, can appear. FIG. 10 illustrates example interface 1000, which can be used for route selection. Interface 1000 can present a plurality of routes for selection displayed as selectable inputs 1002A-1002F. A user 904 may select one of selectable inputs 1002A-1002F via touch, in the case user interface 318 includes a touch screen, and/or any other input mechanism of user interface 318. For example, in some implementations, input 1002F can correspond with route 116 and/or any other route learned in portion 606. When user 904 selects input 1002F, robot 102 can then select and recall the corresponding learned route based at least in part on the selection of user 904. In some cases, when robot 102 detects initialization object 150, it can filter the routes in memory to present for selection only those route(s) that are associated with initialization object 150. This ability can advantageously avoid confusion and prevent user 904 from selecting a route that is not navigable from a particular position relative to initialization object 150.

In some implementations, robot 102 can automatically select a recorded route based on the initialization object it detected in portion 608. For example, initialization object 150 can be associated with only demonstrated route 116.

Figure 11:
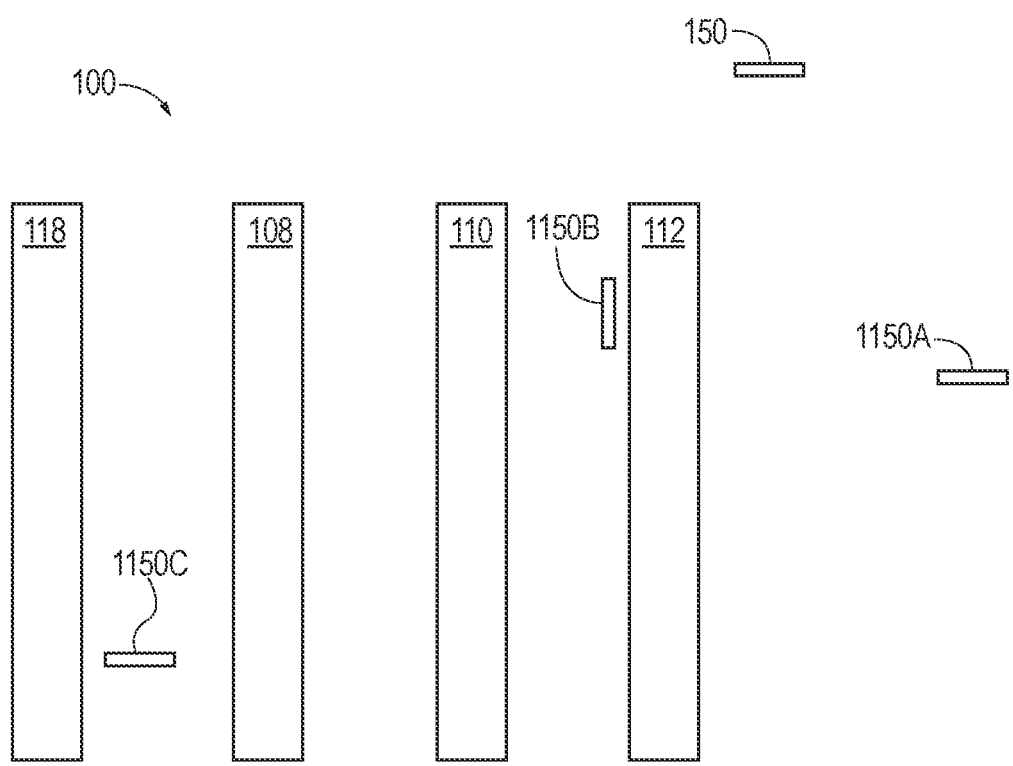
FIG. 11 is an overhead view of an environment with a plurality of initialization objects in accordance with some principles of the present disclosure.

FIG. 11 illustrates example environment 100 with a plurality of example initialization objects 150, 1150A-1150C. For example, initialization object 150 can be associated with only demonstrated route 116. Similarly, robot 102 can have other initialization objects 1150A-C, positioned in one or more locations in environment 100, each associated with other demonstrated routes, and each initialization objects 150, 1150A-1150C, distinguishable by unique characteristics from the others. Advantageously, having a plurality of initialization objects 150, 1150A-1150C can allow a user to demonstrate, and allow robot 102 to move autonomously through, a variety of routes. Moreover, by having robot 102 automatically select a recorded route based on the initial object, robot 102 can more quickly begin autonomous navigation with minimal additional user input. Additional initialization objects can be advantageous when there are multiple floors and/or environments. Each floor and/or environment can have its own initialization objects, distinguishable by unique characteristics from the others. In some cases, each of the plurality of initialization objects can themselves be associated with a plurality of user selectable routes.

Once a route has been selected through user selection or automatically, robot 102 can then autonomously navigate that route. For example, robot 102 can navigate route 106 and/or route 126 autonomously. In some implementations, instead of using a user interface, a user can select routes based at least in part on predetermined actions and/or predetermined sequences of actions of robot 102, such as actions at least in part under user control. For example, in some implementations user 904 can input a sequence of actions (e.g., turn left, turn right, reverse, move forward, etc.) that is associated with a route. When robot 102 receives such a sequence of actions it can recall a particular route and navigate that route. As another example, user 904 can control robot 102 in a particular way, such as in a figure eight, square, and/or in the shape of one or more letters or numbers (e.g., "B", "R", "7", and/or any other letter or number). This control can be associated at least in part with a route. When robot 102 detects that robot 102 has been controlled in the shape of such one or more letters or numbers, it can recall a route associated with that controlled shape and navigate that route.

Figure 12:
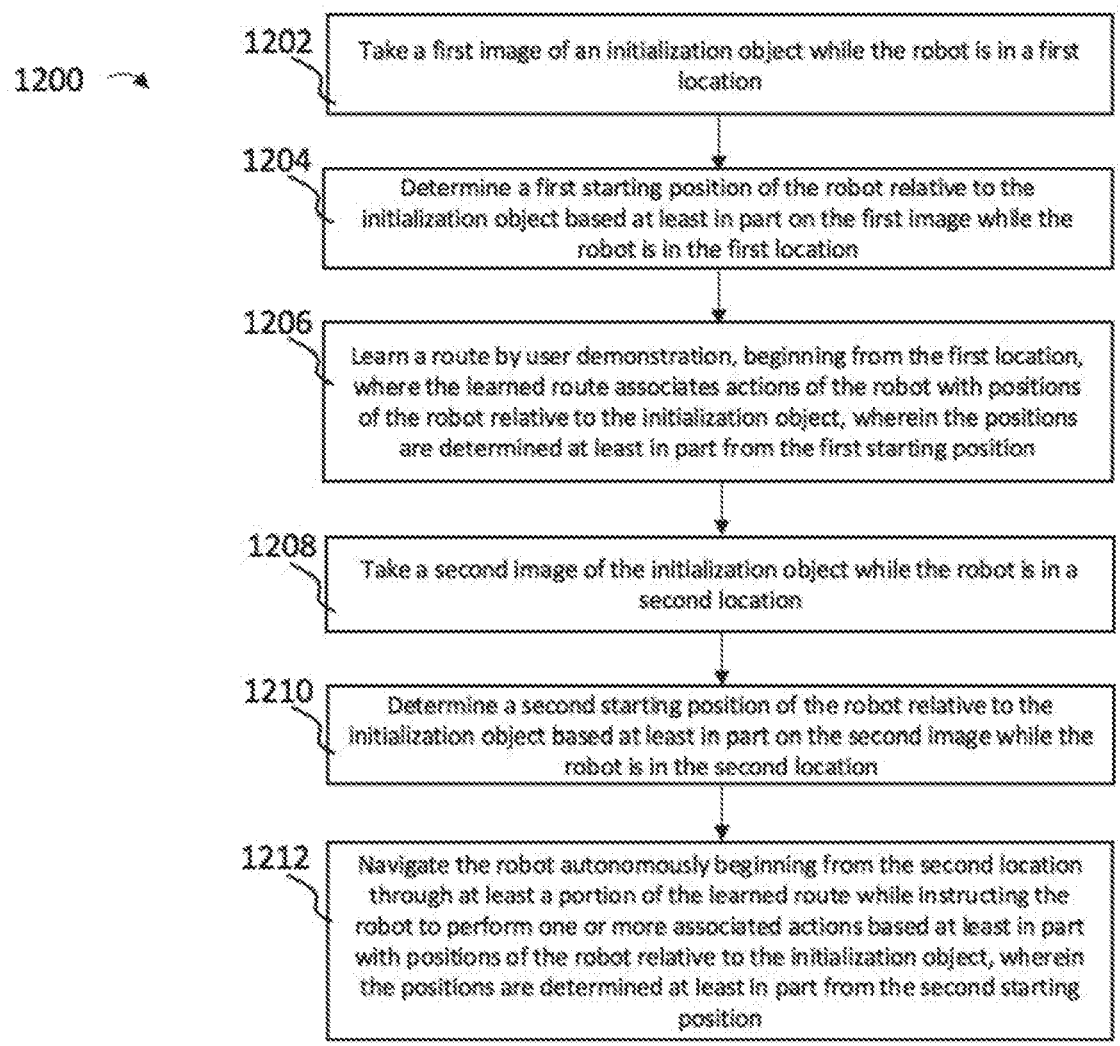
FIG. 12 is a process flow diagram of an exemplary method for operating a robot in accordance with the principles of the present disclosure.

FIG. 12 illustrates an example method 1200 for operating an example robot 102. Portion 1202 includes taking a first image of an initialization object while the robot is in a first location. Portion 1204 includes determining a first starting position of the robot relative to the initialization object based at least in part on the first image while the robot is in the first location. Portion 1206 includes learning a route by user demonstration, beginning from the first location, where the learned route associates actions of the robot with positions of the robot relative to the initialization object, wherein the positions are determined at least in part from the first starting position. Portion 1208 includes taking a second image of the initialization object while the robot is in a second location. Portion 1210 includes determining a second starting position of the robot relative to the initialization object based at least in part on the second image while the robot is in the second location. Portion 1212 includes navigating the robot autonomously beginning from the second location through at least a portion of the learned route while instructing the robot to perform one or more associated actions based at least in part with positions of the robot relative to the initialization object, wherein the positions are determined at least in part from the second starting position.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are syn- onymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for maneuvering a robot, comprising:
a memory including computer readable instructions stored thereon; and
at least one processor configured to execute the computer readable instructions to,
determine a starting position of the robot relative to an initialization object, of a plurality of initialization objects of an environment, based at least in part on an image detected by a sensor coupled to the robot;
learn a plurality of routes by user demonstration in a learning mode, wherein each of the learned routes includes an association between a plurality of actions and positions of the robot with the detected initialization object of the plurality of initialization objects, wherein the positions are determined based at least in part on odometry from the starting position of the robot for each route;
detect the initialization object in a second image;
autonomously select one or more learned routes based upon the association between the one or more learned routes and the initialization object upon detecting the initialization object in the second image; and
navigate a user-selected one of the one or more learned routes associated with the initialization object based on the determined starting position from the second image and a user indication, and execute the plurality of actions associated with positions of the robot relative to the initialization object based at least in part on odometry from the starting position during navigation of the learned route.

2. The system of claim 1, wherein the at least one processor is further configured to execute the computer readable instructions to recognize, based upon the association between the one or more learned routes and the initialization object upon detecting the initialization object in the second image, a predetermined sequence of actions and autonomously navigate the learned route based at least in part on the predetermined sequence of actions.

3. The system of claim 1, wherein the at least one processor is further configured to execute the computer readable instructions to,
determine, in the learning mode, position of the robot relative to the initialization object at a first location,
route, in the learning mode, the robot from the first location to a second location along a desired path,
store, in the learning mode, the initialization object and a plurality of actions demonstrated by a user with respect to a particular position along the desired path while the robot travels the route from the first location to the second location, and
associate, in the learning mode, the route and the plurality of actions to the initialization object.

4. The system of claim 1, wherein the at least one processor is further configured to execute the computer readable instructions to,
  determine, in an autonomous mode different from the learning mode, position of the robot relative to the initialization object using the second image; and
  upload, in the autonomous mode, one of the learned routes and the associated plurality of actions learned in the learning mode if there is a match between the initialization object identified in the autonomous mode and the learning mode.

5. The system of claim 1, wherein the at least one processor is further configured to execute the computer readable instructions to store a library of images of an initialization object associated with at least one learned route such that detection of the initialization object from the library of images of the initialization object causes the robot to execute the plurality of actions in the autonomous mode.

6. The system of claim 1, wherein the initialization object is a binary image and asymmetrical.

7. The system of claim 1, wherein the robot is at least one selected from the group consisting of a floor scrubber, a vacuum cleaner, a steamer, a mop, and a sweeper.

8. The system of claim 1, wherein the plurality of actions include at least one selected from the group consisting of regulating water flow, turning on or off water supply, turning on or off vacuum, moving vacuum hose position, raising or lower a lift, and turning on or off a sensor.

9. The system of claim 1, wherein the robot is a floor cleaner, and at least one of the plurality of actions is regulating water flow and turning on or off the water supply such that only the particular position along the desired path is cleaned.

10. A non-transitory computer readable medium comprising computer readable instructions stored thereon that when executed by at least one processor configure the at least one processor to,
  determine a starting position of a robot relative to an initialization object, of a plurality of initialization objects of an environment, based at least in part on an image detected by a sensor coupled to the robot;
  learn a plurality of routes by user demonstration in a learning mode, wherein each of the learned routes includes an association between a plurality of actions and positions of the robot with the detected initialization object of the plurality of initialization objects, wherein the positions are determined based at least in part on odometry from the starting position of the robot for each route;
  detect the initialization object in a second image;
  autonomously select one or more learned routes based upon the association between the one or more learned routes and the initialization object upon detecting the initialization object in the second image; and
  navigate a user-selected one of the learned routes associated with the initialization object based on the determined starting position from the second image and a user indication, and execute the plurality of actions associated with positions of the robot relative to the initialization object based at least in part on odometry from the starting position during navigation of the learned route.

11. The non-transitory computer-readable storage medium of claim 10, wherein the at least one processor is further configured to execute the computer readable instructions to recognize a predetermined sequence of actions and autonomously navigate the learned route based at least in part on the predetermined sequence of actions.

12. The non-transitory computer-readable storage medium of claim 10, wherein the at least one processor is further configured to execute the computer readable instructions to
  determine, in the learning mode, position of the robot relative to the initialization object at a first location,
  route, in the learning mode, the robot from the first location to a second location along a desired path,
  store, in the learning mode, the initialization object and a plurality of actions demonstrated by a user with respect to a particular position along the desired path while the robot travels the route from the first location to the second location, and
  associate, in the learning mode, the route and the plurality of actions to the initialization object.

13. The non-transitory computer-readable storage medium of claim 10, wherein the at least one processor is further configured to execute the computer readable instructions to,
  determine, in an autonomous mode different from the learning mode, position of the robot relative to the initialization object from the second image; and
  upload, in the autonomous mode, one of the learned routes and the associated plurality of actions learned in the learning mode if there is a match between the initialization object identified in the autonomous mode and the learning mode.

14. The non-transitory computer-readable storage medium of claim 10 wherein the at least one processor is further configured to execute the computer readable instructions to store a library of images of an initialization object associated with at least one learned route such that detection of the initialization object from the library of images of initialization object causes the robot to execute the plurality of actions in the autonomous mode.

15. The non-transitory computer-readable storage medium of claim 14, wherein the initialization object is a binary image and asymmetrical.

16. A method for maneuvering a robot, comprising:
  determining a starting position of a robot relative to an initialization object, of a plurality of initialization objects of an environment, based at least in part on an image detected by a sensor coupled to the robot;
  learning a plurality of routes by user demonstration in a learning mode, wherein each of the learned routes includes an association between a plurality of actions and positions of the robot with the detected initialization object of the plurality of initialization objects, wherein the positions are determined based at least in part on odometry from the starting position of the robot for each route;
  detecting the initialization object in a second image;
  autonomously selecting one or more learned routes based upon the association between the one or more learned routes and the initialization object upon detecting the initialization object in the second image; and
  navigating a user-selected one of the one or more learned routes associated with the initialization object based on the determined starting position from the second image and a user indication, and executing the plurality of actions associated with positions of the robot relative to the initialization object based at least in part on odometry from the starting position during navigation of the learned route.

17. The method of claim 16, further comprising:

recognizing a predetermined sequence of actions and autonomously navigating the learned route based at least in part on the predetermined sequence of actions.

18. The method of claim 16, further comprising:

determining, in the learning mode, position of the robot relative to the initialization object at a first location, routing, in the learning mode, the robot from the first location to a second location along a desired path, storing, in the learning mode, the initialization object and a plurality of actions demonstrated by a user with respect to a particular position along the desired path while the robot travels the route from the first location to the second location, and associating, in the learning mode, the route and the plurality of actions to the initialization object.

19. The method of claim 16, further comprising:

determining, in an autonomous mode different from the learning mode, position of the robot relative to the initialization object from the second image; and uploading, in the autonomous mode, one of the learned routes and the associated plurality of actions learned in the learning mode if there is a match between the initialization object identified in the autonomous mode and the learning mode.

20. The method of claim 16, further comprising:

storing a library of images of an initialization object associated with at least one learned route such that detection of the initialization object from the library of images of initialization object causes the robot to execute the plurality of actions in the autonomous mode.

21. The method of claim 20, wherein the initialization object is a binary image and asymmetrical.

* * * * *